(12) United States Patent
Park

(10) Patent No.: US 8,089,213 B2
(45) Date of Patent: Jan. 3, 2012

(54) LED FLUORESCENT LAMP

(75) Inventor: Myung Koo Park, Seoul (KR)

(73) Assignees: Myung Koo Park (KR); Kumho Electric Inc. (KR)

( * ) Notice: Subject to any disclaimer, the term of this patent is extended or adjusted under 35 U.S.C. 154(b) by 283 days.

(21) Appl. No.: 12/611,488

(22) Filed: Nov. 3, 2009

(65) Prior Publication Data

US 2010/0194296 A1 Aug. 5, 2010

(30) Foreign Application Priority Data

Feb. 5, 2009 (KR) .................. 10-2009-0009392
Jul. 1, 2009 (KR) .................. 10-2009-0059893

(51) Int. Cl.
*H05B 37/00* (2006.01)

(52) U.S. Cl. ................ 315/227 R; 315/185 R; 315/244; 315/291

(58) Field of Classification Search .............. 315/185 R, 315/187, 227 R, 228, 244, 291, 299, 294
See application file for complete search history.

(56) References Cited

U.S. PATENT DOCUMENTS

| 7,791,285 | B2 * | 9/2010 | Wu ............................ 315/227 R |
| 7,855,514 | B2 * | 12/2010 | Ku et al. ...................... 315/132 |
| 2010/0109560 | A1 * | 5/2010 | Yu et al. ...................... 315/294 |

FOREIGN PATENT DOCUMENTS

JP 2003-197002 A 7/2003
JP 2008-277188 A 11/2008

OTHER PUBLICATIONS

English Language Abstract of JP 2003-197002 A.
English Language Abstract of JP 2008-277188 A.

\* cited by examiner

*Primary Examiner* — Thuy Vinh Tran
(74) *Attorney, Agent, or Firm* — Hershkovitz & Associates, LLC; Abraham Hershkovitz

(57) ABSTRACT

Provided is a light-emitting diode (LED) fluorescent lamp using as light sources a plurality of LEDs, which are eco-friendly and can contribute to power conservation. The LED fluorescent lamp includes an LED array including a plurality of LEDs connected in series; first through fourth connection pins; first through fourth capacitors connected to the first through fourth connection pins, respectively; a first diode having an anode connected to a second end of the first capacitor and a cathode connected to a first end of the LED array; a second diode having an anode connected to a second end of the LED array and a cathode connected to a second end of the second capacitor; a third diode having an anode connected to the second end of the LED array and a cathode connected to a second end of the third capacitor; and a fourth diode having an anode connected to a second end of the fourth capacitor and a cathode connected commonly to the first end of the LED array and the cathode of the first diode. The LED fluorescent lamp can be readily used in various types of fluorescent lamp ballasts without a requirement of the installation of additional equipment or the change of wiring.

20 Claims, 27 Drawing Sheets

US 8,089,213 B2

LED FLUORESCENT LAMP

CROSS-REFERENCE TO RELATED APPLICATION

This application claims the priority benefit of Korean Patent Application No. 10-2009-0009392, filed on Feb. 5, 2009 and No. 10-2009-0059893, filed on Jul. 1, 2009 in the Korean Intellectual Property Office, the disclosure of which is incorporated herein by reference.

BACKGROUND OF THE INVENTION

1. Field of the Invention

The present invention relates to a light-emitting diode (LED) fluorescent lamp, and more particularly, to an LED fluorescent lamp which can be readily used in various types of existing fluorescent lamp ballasts without a requirement of the installation of additional equipment or the change of wiring.

2. Description of the Related Art

Due to the improvement of the optical efficiency of light-emitting diodes (LEDs), which are previously used as low-power indicator lights, the range of application of LEDs has gradually widened. LEDs, unlike other light sources, do not contain mercury and are thus deemed as environment-friendly light sources. Therefore, LEDs have recently come into the limelight as next-generation light sources for mobile terminals, liquid crystal display (LCD) TVs, or automobiles. Accordingly, incandescent lamps or fluorescent lamps, which have been used as major light sources for the past hundred years, are rapidly being replaced by LED fluorescent lamps.

However, in order to replace existing fluorescent lamps with LED fluorescent lamps, it is necessary to change wiring or lamp fixtures or to additionally install fluorescent lamp ballasts exclusively for LED fluorescent lamps. Thus, LED fluorescent lamps have not yet been widespread.

SUMMARY OF THE INVENTION

The present invention provides a light-emitting diode (LED) fluorescent lamp which can be driven by various types of existing fluorescent lamp ballasts without a requirement of the installation of additional equipment or the change of wiring.

According to an aspect of the present invention, there is provided an LED fluorescent lamp including an LED array including a plurality of LEDs connected in series; first through fourth connection pins; first through fourth capacitors connected to the first through fourth connection pins, respectively; a first diode having an anode connected to a second end of the first capacitor and a cathode connected to a first end of the LED array; a second diode having an anode connected to a second end of the LED array and a cathode connected to a second end of the second capacitor; a third diode having an anode connected to the second end of the LED array and a cathode connected to a second end of the third capacitor; and a fourth diode having an anode connected to a second end of the fourth capacitor and a cathode connected commonly to the first end of the LED array and the cathode of the first diode.

According to another aspect of the present invention, there is provided an LED fluorescent lamp including an LED array including a plurality of LEDs connected in series; first through fourth connection pins; a first diode having a cathode connected to a first end of the LED array; a second diode having an anode connected to a second end of the LED array; a third diode having an anode connected commonly to the second end of the LED array and the anode of the second diode; a fourth diode having a cathode connected commonly to the first end of the LED array and the cathode of the first diode; a fifth diode having an anode connected to the first connection pin and a cathode connected to the anode of the first diode; a sixth diode having an anode connected to the cathode of the second diode and a cathode connected to the second connection pin; a seventh diode having an anode connected to the cathode of the third diode and a cathode connected to the third connection pin; an eighth diode having an anode connected to the fourth connection pin and a cathode connected to the anode of the fourth diode; a ninth diode having a cathode connected to the first connection pin and an anode connected to the cathode of the second diode; a tenth diode having a cathode connected to the cathode of the fifth diode and an anode connected to the second connection pin; an eleventh diode having a cathode connected to the fourth connection pin and an anode connected to the anode of the seventh diode; and a twelfth diode having a cathode connected to the cathode of the eighth diode and an anode connected to the third connection pin.

According to another aspect of the present invention, there is provided an LED fluorescent lamp including first through n-th LED arrays connected in parallel to one another; a first diode having a cathode connected to a first node to which first ends of the first through n-th LED arrays are commonly connected; a second diode having an anode connected to a second node to which second ends of the first through n-th LED arrays are commonly connected; a third diode having an anode connected commonly to the second node and the anode of the second diode; a fourth diode having a cathode connected commonly to the first node and the cathode of the first diode; a fifth diode having an anode connected to the first connection pin and a cathode connected to the anode of the first diode; a sixth diode having an anode connected to the cathode of the second diode and a cathode connected to the second connection pin; a seventh diode having an anode connected to the cathode of the third diode and a cathode connected to the third connection pin; and an eighth diode having an anode connected to the fourth connection pin and a cathode connected to the anode of the fourth diode.

According to another aspect of the present invention, there is provided an LED fluorescent lamp including first through fourth connection pins; first through fourth capacitors connected to the first through fourth connection pins, respectively; a first diode having an anode connected to a second end of the first capacitor; a second diode having a cathode connected to a second end of the second capacitor; a third diode having an anode connected to the anode of the second diode and a cathode connected to a second end of the third capacitor; a fourth diode having an anode connected to a second end of the fourth capacitor and a cathode connected to the cathode of the first diode; a fifth diode having an anode connected to the first connection pin and a cathode connected to the anode of the first diode; a sixth diode having an anode connected to the cathode of the second diode and a cathode connected to the second connection pin; a seventh diode having an anode connected to the cathode of the third diode and a cathode connected to the third connection pin; an eighth diode having an anode connected to the fourth connection pin and a cathode connected to the anode of the fourth diode; and an LED array circuit unit having a first end connected to a first node to which the cathode of the first diode and the cathode of the fourth diode are connected and a second end connected to a second node to which the anode of the second diode and the anode of the third diode are connected, the LED array circuit unit including at least one LED array and at least one inductor connected in series.

BRIEF DESCRIPTION OF THE DRAWINGS

The above and other features and advantages of the present invention will become more apparent by describing in detail preferred embodiments thereof with reference to the attached drawings in which.

DETAILED DESCRIPTION OF THE INVENTION

The present invention will hereinafter be described in detail with reference to the accompanying drawings in which exemplary embodiments of the invention are shown.

An electronic fluorescent lamp ballast may be largely classified into a half bridge-type, instant start-type or program start-type electronic fluorescent lamp ballast. LED fluorescent lamps according to exemplary embodiments of the present invention may be configured to be easily applicable to nearly all types of fluorescent lamp ballasts. The structures of LED fluorescent lamps according to exemplary embodiments of the present invention and the operations of various types of fluorescent lamp ballasts to which the LED fluorescent lamps according to the exemplary embodiments of the present invention are applied will hereinafter be described in detail.

Figure 1:
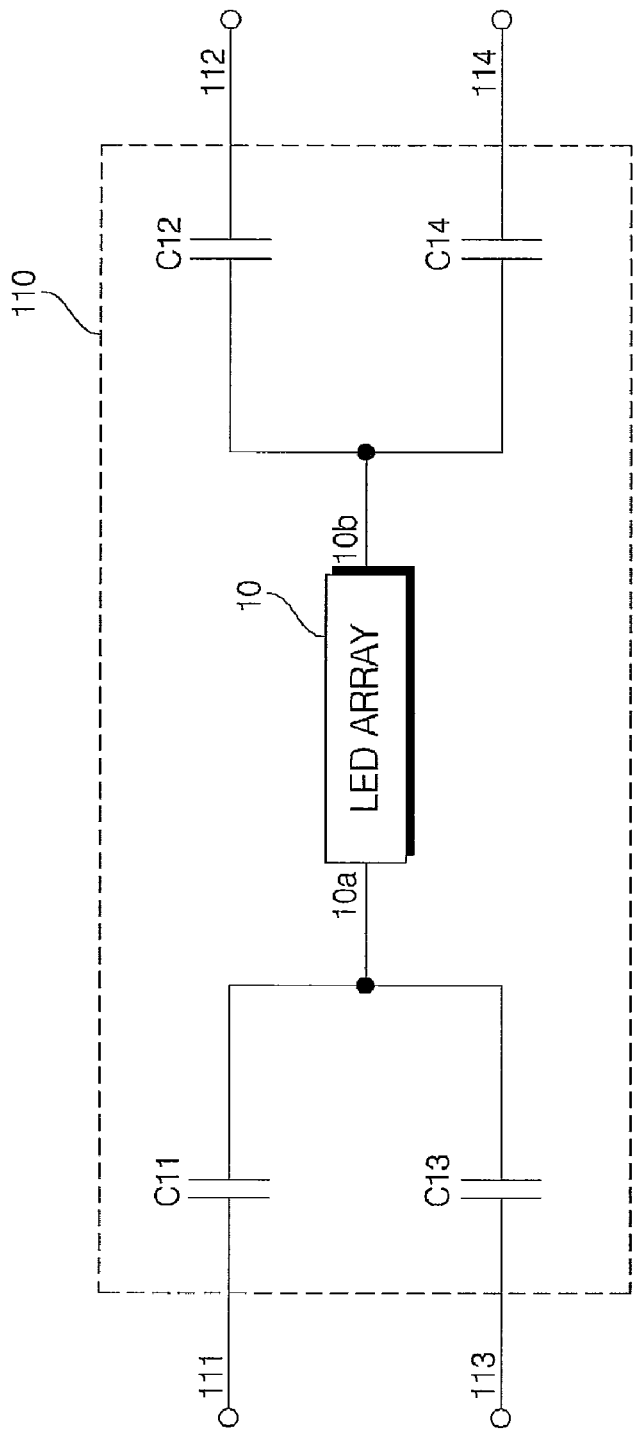
FIG. 1 illustrates a circuit diagram of a light-emitting diode (LED) fluorescent lamp according to a first exemplary embodiment of the present invention.

FIG. 1 illustrates a circuit diagram of an LED fluorescent lamp 110 according to a first exemplary embodiment of the present invention. Referring to FIG. 1, the LED fluorescent lamp 110 may include an LED array 10, a plurality of capacitors C11 through C14, and a plurality of external connection pins, i.e., first through fourth connection pins 111 through 114. The LED fluorescent lamp 110 may include two or more LED arrays 10 connected in parallel to each other. The structure of the LED fluorescent lamp 110 can be directly applied to LED fluorescent lamps according to other exemplary embodiments of the present invention.

The LED array 10 may include a plurality of LEDs (not shown) connected in series, an anode terminal 10a and a cathode terminal 10b. The capacitor C11 may be connected between the anode terminal 10a and the first connection pin 111. The capacitor C12 may be connected between the cathode terminal 10b and the second connection pin 112. The capacitor C13 may be connected between the anode terminal 10a and the third connection pin 113. The capacitor C14 may be connected between the cathode terminal 10a and the fourth connection pin 114.

The capacitors C11 through C14 may be connected to a fluorescent lamp ballast such as a half-bridge type electronic ballast via the first through fourth connection pins 111 through 114 and may thus control the capacitance of a series resonant circuit of the fluorescent lamp ballast. Due to the variation of the capacitance of the series resonant circuit, the impedance of a current-control inductor in the fluorescent lamp ballast inside the ballast may increase, and thus, the amount of current that flows in the LED fluorescent lamp 110 may decrease. Therefore, it is possible to control the power consumption of the LED fluorescent lamp 110 by using a typical electronic fluorescent ballast without the need to modify the structure of the typical electronic fluorescent ballast.

Figure 2A:
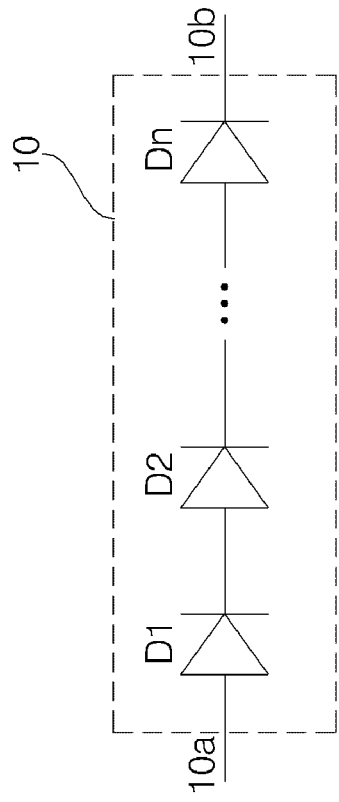
FIG. 2A and 2B illustrate a circuit diagram of an LED array shown in FIG. 1.

FIG. 2 illustrates a circuit diagram of the LED array 10 shown in FIG. 1. Referring to FIG. 2(a), the LED array 10 may include a plurality of LEDs $D_1$ through $D_n$ connected in series.

Figure 2B:
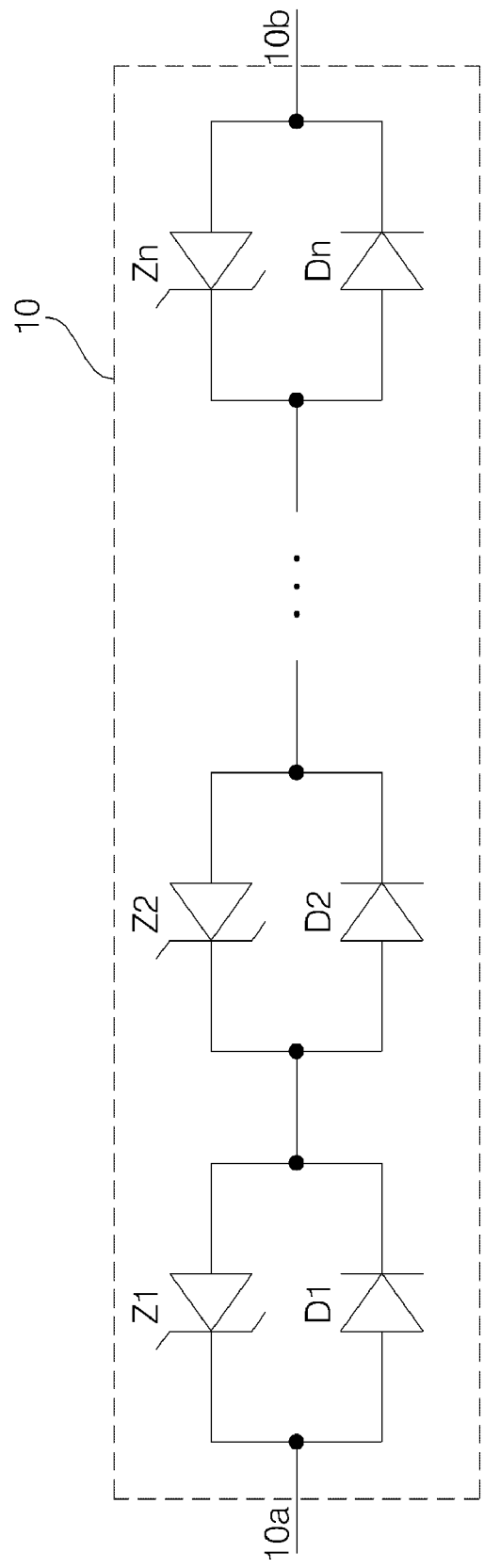

Alternatively, for a better protection of the LEDs $D_1$ through $D_n$, the LED array 10 may also include a plurality of zener diodes $Z_1$ through $Z_n$ connected in parallel to the LEDs $D_1$ through $D_n$, respectively, in an opposite direction to the direction in which the LEDs $D_1$ through $D_n$ are aligned, as shown in FIG. 2(b). In this case, if the applied voltage at the anode terminal 10a is positive with respect to the cathode terminal 10b, a current may flow through the LEDs $D_1$ through $D_n$. On the other hand, during a negative period of an input AC voltage, a current may flow through the zener diodes $Z_1$ through $Z_n$. The flow of a current through the zener diodes $Z_1$ through $Z_n$ may become an ineffective loss. Therefore, in order to prevent the flow of a reverse current through the zener diodes Z1 through Zn and thus to improve efficiency, various modifications may be made to the first exemplary embodiment, and this will hereinafter be described in detail.

Figure 3:
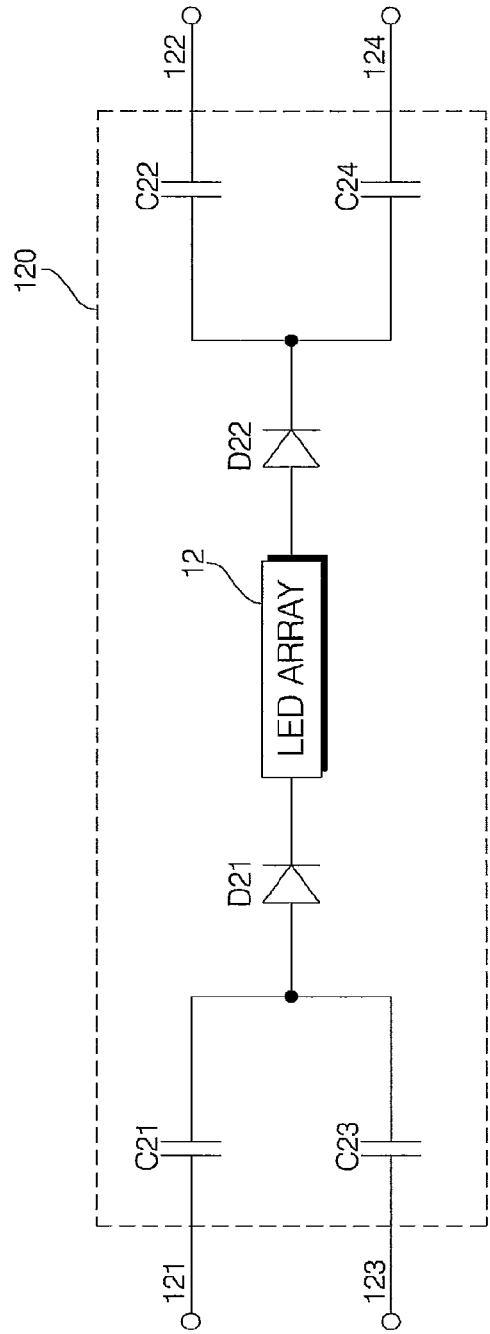
FIG. 3 illustrates a circuit diagram of an LED fluorescent lamp according to a second exemplary embodiment of the present invention.

FIG. 3 illustrates a circuit diagram of an LED fluorescent lamp 120 according to a second exemplary embodiment of the present invention. The second exemplary embodiment is the same as the first exemplary embodiment except that the LED fluorescent lamp 120 includes two additional diodes $D_{21}$ and $D_{22}$ connected in series to either end of an LED array 12. Referring to FIG. 3, the diode $D_{21}$ may be connected between an anode terminal of an LED array 12 and a node between capacitors $C_{21}$ and $C_{23}$, and the diode $D_{22}$ may be connected between a cathode terminal of the LED array 12 and a node between capacitors $C_{22}$ and $C_{24}$. Due to the diodes $D_{21}$ and $D_{22}$, a stabilization current can flow in the LED fluorescent lamp 120 regardless of the polarity of an output terminal of a fluorescent lamp ballast.

Figure 4:
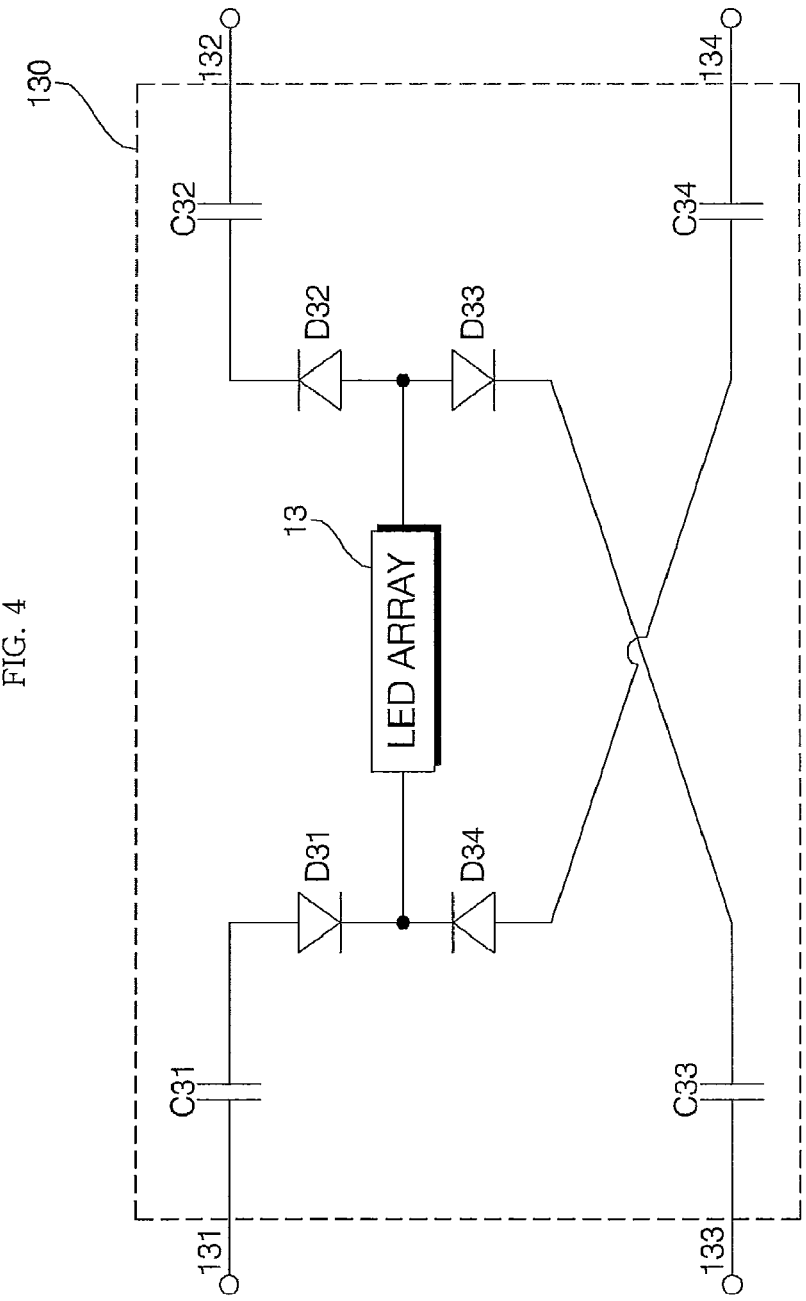
FIG. 4 illustrates a circuit diagram of an LED fluorescent lamp according to a third exemplary embodiment of the present invention.

FIG. 4 illustrates a circuit diagram of an LED fluorescent lamp 130 according to a third exemplary embodiment of the present invention. Referring to FIG. 4, the LED fluorescent lamp 130 may include a plurality of diodes $D_{31}$ through $D_{34}$ and may thus be able to stably operate in various fluorescent lamp ballasts regardless of a variation in the phase of an AC voltage applied to first through fourth connection pins 131 through 134.

Figure 5:
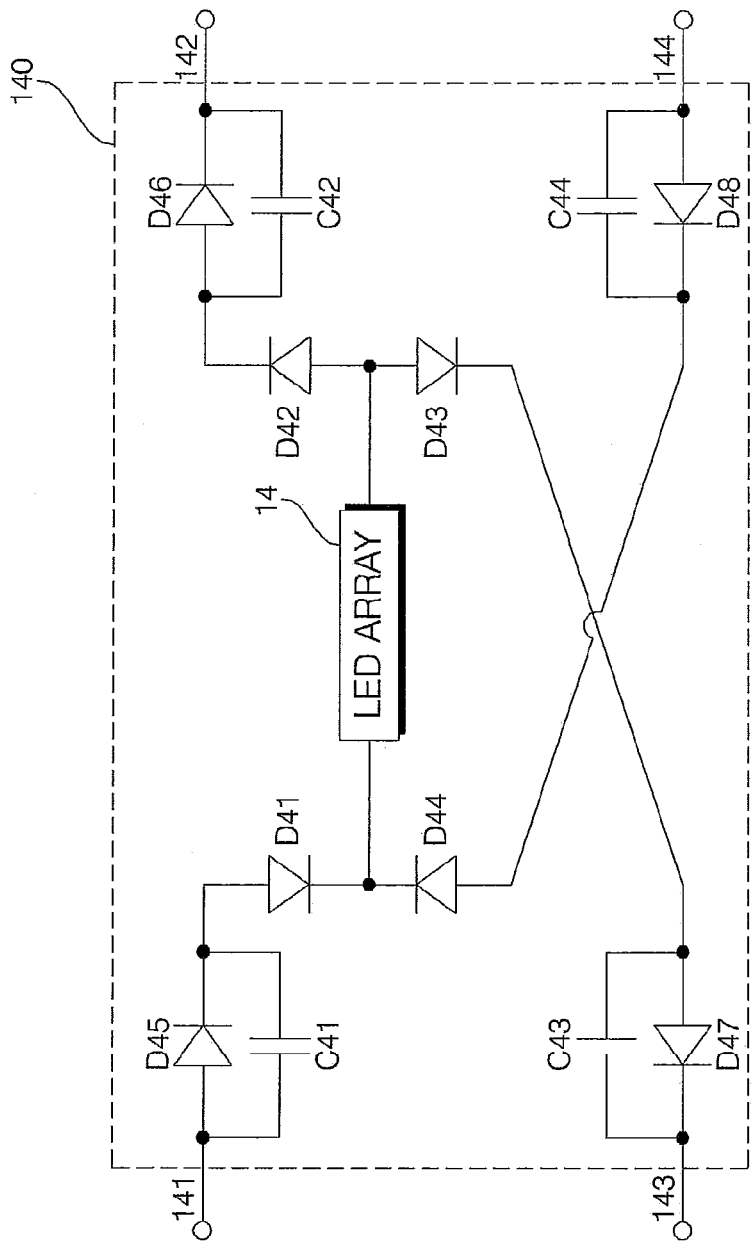
FIG. 5 illustrates a circuit diagram of an LED fluorescent lamp according to a fourth exemplary embodiment of the present invention.

FIG. 5 illustrates a circuit diagram of an LED fluorescent lamp 140 according to a fourth exemplary embodiment of the present invention. The fourth exemplary embodiment is the same as the third exemplary embodiment except that the LED fluorescent lamp 140 includes a plurality of additional diodes $D_{45}$ through $D_{48}$. Referring to FIG. 4, a plurality of capacitors $C_{41}$ through $C_{44}$ may be connected to first through fourth connection pins 141 through 144, respectively, and the diodes $D_{45}$ through $D_{48}$ may be connected to the capacitors $C_{41}$ through $C_{44}$, respectively, in parallel.

Figure 6A:
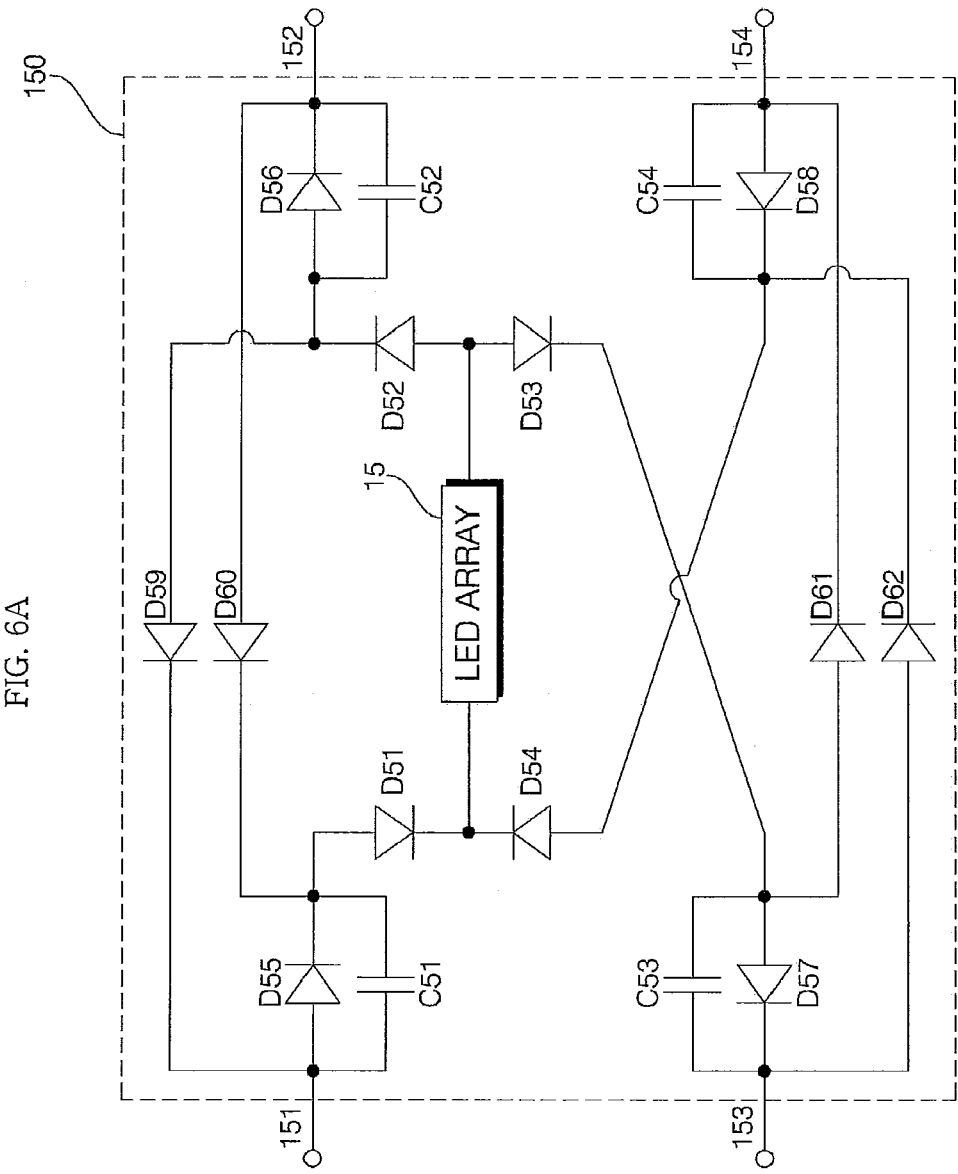
FIGS. 6A through 6C illustrate circuit diagrams of an LED fluorescent lamp according to a fifth exemplary embodiment of the present invention.
Figure 6B:
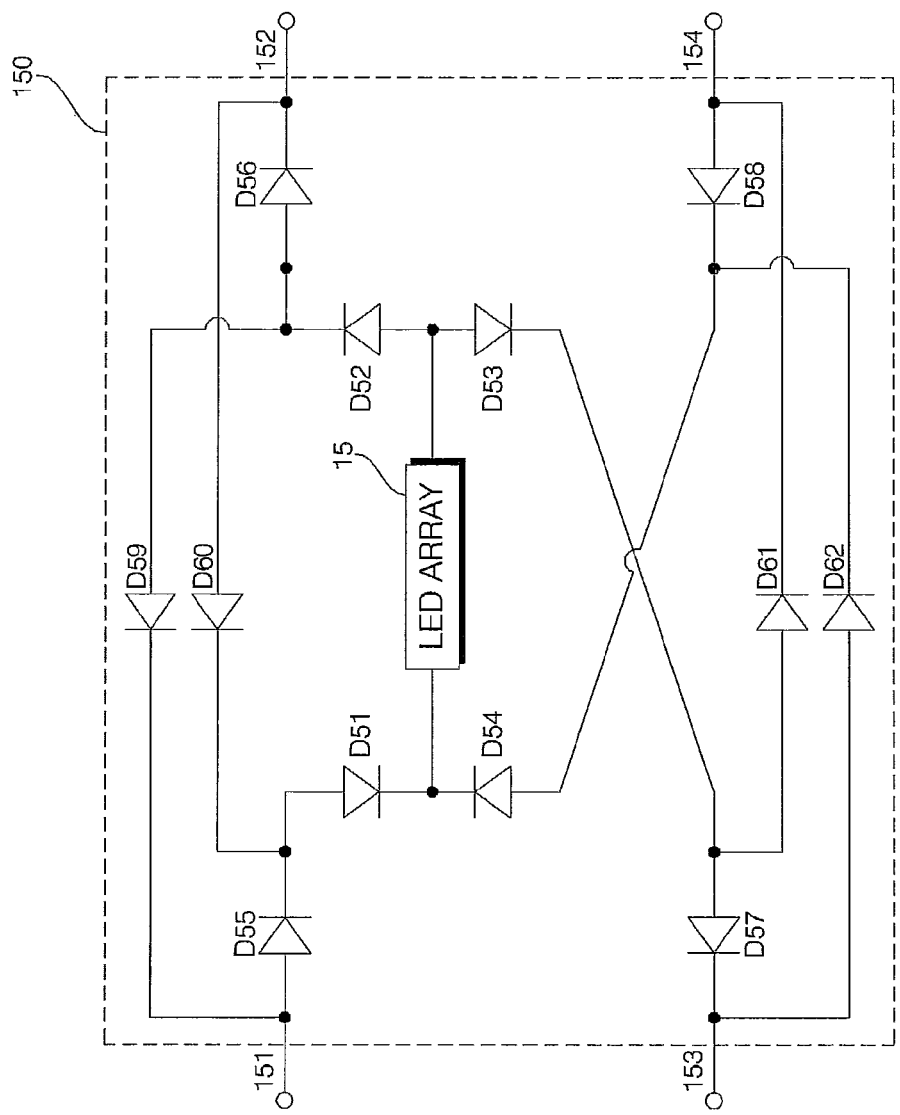
Figure 6C:
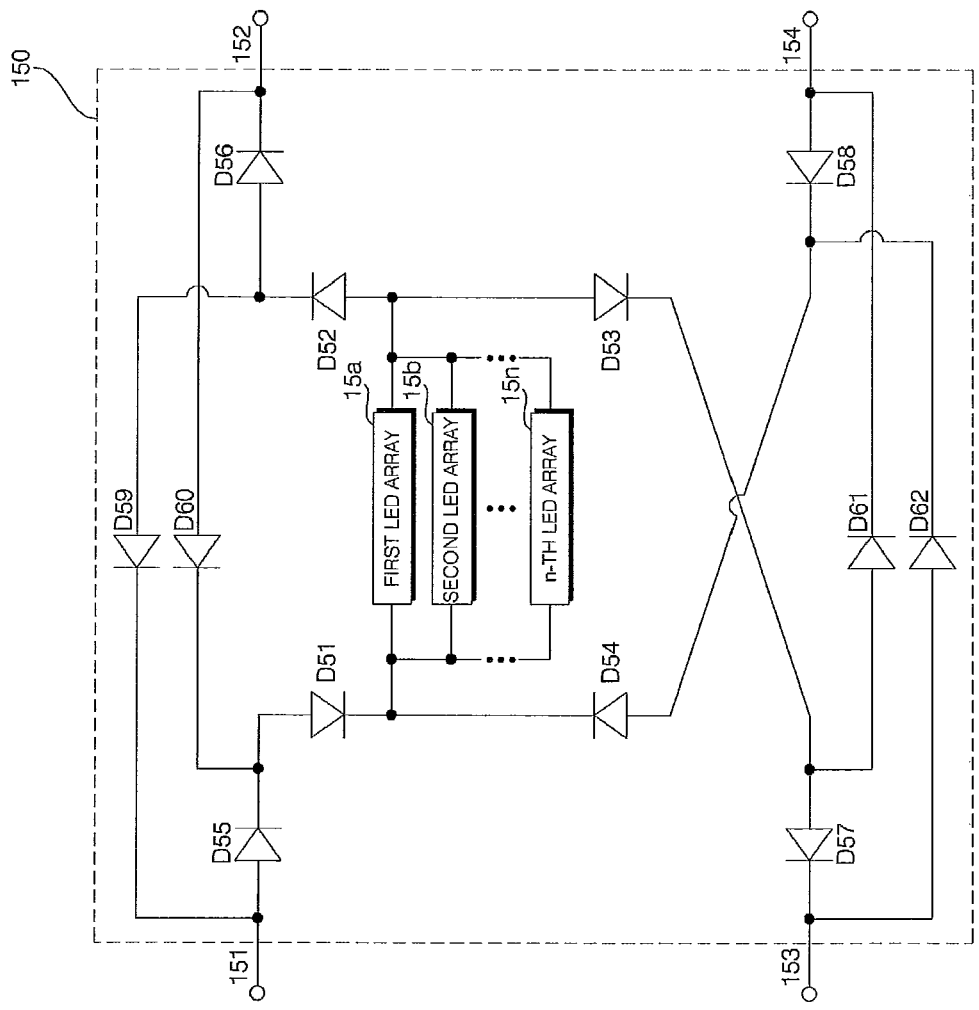

FIGS. 6A through 6C illustrate circuit diagrams of an LED fluorescent lamp 150 according to a fifth exemplary embodiment of the present invention. Referring to FIG. 6A, the LED fluorescent lamp 150 may include a plurality of diodes $D_{51}$ through $D_{54}$ and may thus be able to stably operate in various fluorescent lamp ballasts regardless of a variation in the phase of an AC voltage applied to first through fourth connection pins 151 through 154.

The fifth exemplary embodiment is different from the first exemplary embodiment in that the LED fluorescent lamp 150 includes a plurality of additional diodes $D_{55}$ through $D_{58}$. Referring to FIG. 6A, a plurality of capacitors $C_{41}$ through $C_{44}$ may be connected to first through fourth connection pins 151 through 154, respectively, and the diodes $D_{55}$ through $D_{58}$ may be connected to the capacitors $C_{41}$ through $C_{44}$, respectively, in parallel.

The LED fluorescent lamp 150 may also include a plurality of diodes $D_{59}$ through $D_{62}$. The cathode of the diode $D_{59}$ may be connected to the first connection pin 151, and the anode of the diode $D_{59}$ may be connected to the cathode of the diode $D_{52}$. The anode of the diode $D_{60}$ may be connected to the second connection pin 152, and the cathode of the diode $D_{60}$ may be connected to the anode of the diode $D_{51}$. The cathode of the diode $D_{61}$ may be connected to the fourth connection pin 154, and the anode of the diode $D_{61}$ may be connected to the cathode of the diode $D_{53}$. The anode of the diode $D_{62}$ may be connected to the third connection pin 153, and the cathode of the diode $D_{62}$ may be connected to the anode of the diode $D_{54}$. Since the LED fluorescent lamp 150 has a symmetric structure and thus performs symmetrically with respect to a voltage applied thereto, the LED fluorescent lamp 150 can be readily used in an existing fluorescent lamp assembly.

The capacitors $C_{51}$ through $C_{54}$ may not be used in the LED fluorescent lamp 150, as shown in FIG. 6B. The LED fluorescent lamp 150 may include more than one LED array, e.g., first through n-th LED arrays 15a through 15n connected in parallel to one another, as shown in FIG. 6C.

Figure 7:
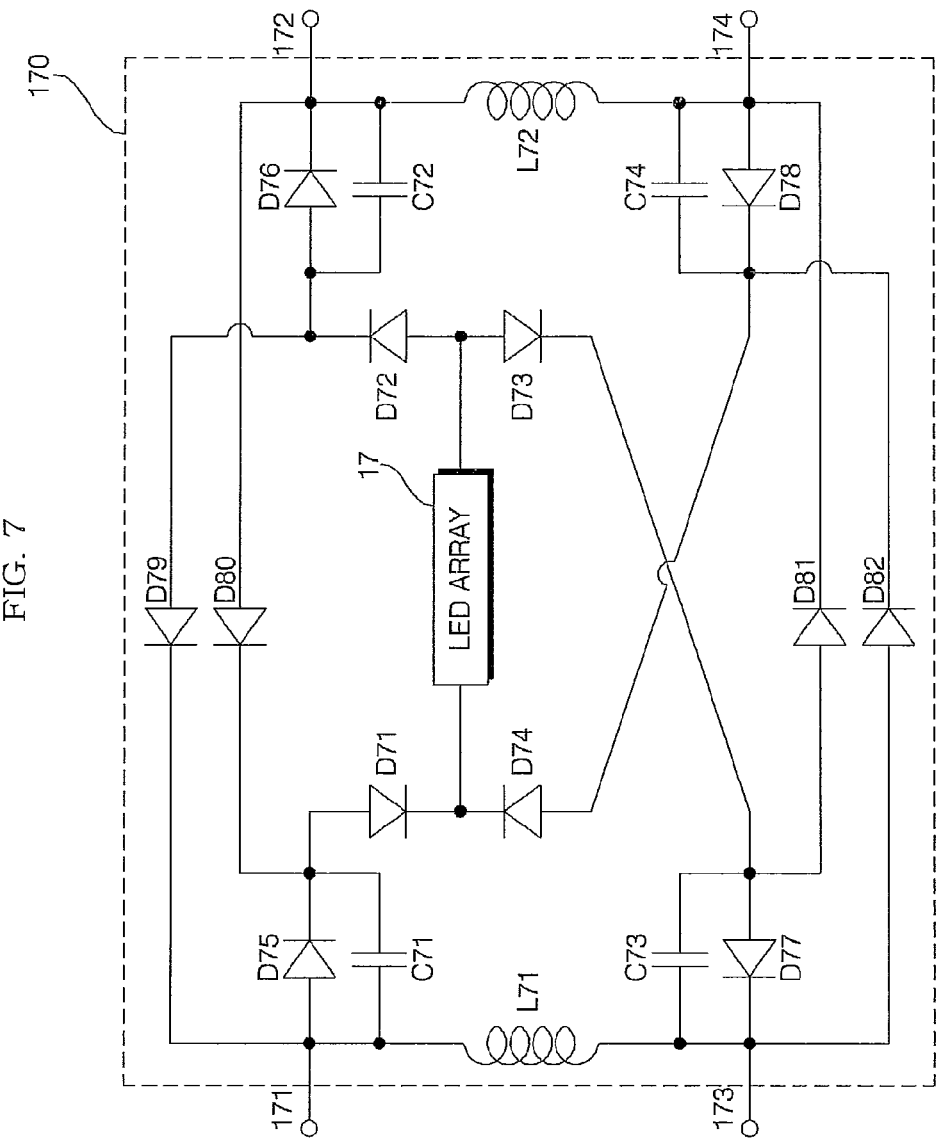
FIG. 7 illustrates a circuit diagram of an LED fluorescent lamp according to a sixth exemplary embodiment of the present invention.

FIG. 7 illustrates a circuit diagram of an LED fluorescent lamp 170 according to a sixth exemplary embodiment of the present invention. Referring to FIG. 7, the LED fluorescent lamp 170 may include first through fourth connection pins 171 through 174, an inductor $L_{71}$ connected between the first and third connection pins 171 and 173, and an inductor $L_{72}$ connected between the second and fourth connection pins 172 and 174. The inductors $L_{71}$ and $L_{72}$ may serve as filaments of a fluorescent lamp at an early phase of the operation of an electronic lamp ballast, and may thus prevent a filament detection/protection circuit from operation. In addition, when the LED fluorescent lamp 170 is turned on, the inductance of the inductors $L_{71}$ and $L_{72}$ may be added to the inductance of a resonant circuit, thereby controlling the power applied to the LED fluorescent lamp 170.

The inductors $L_{71}$ and $L_{71}$ may be replaced by resistors.

Figure 8A:
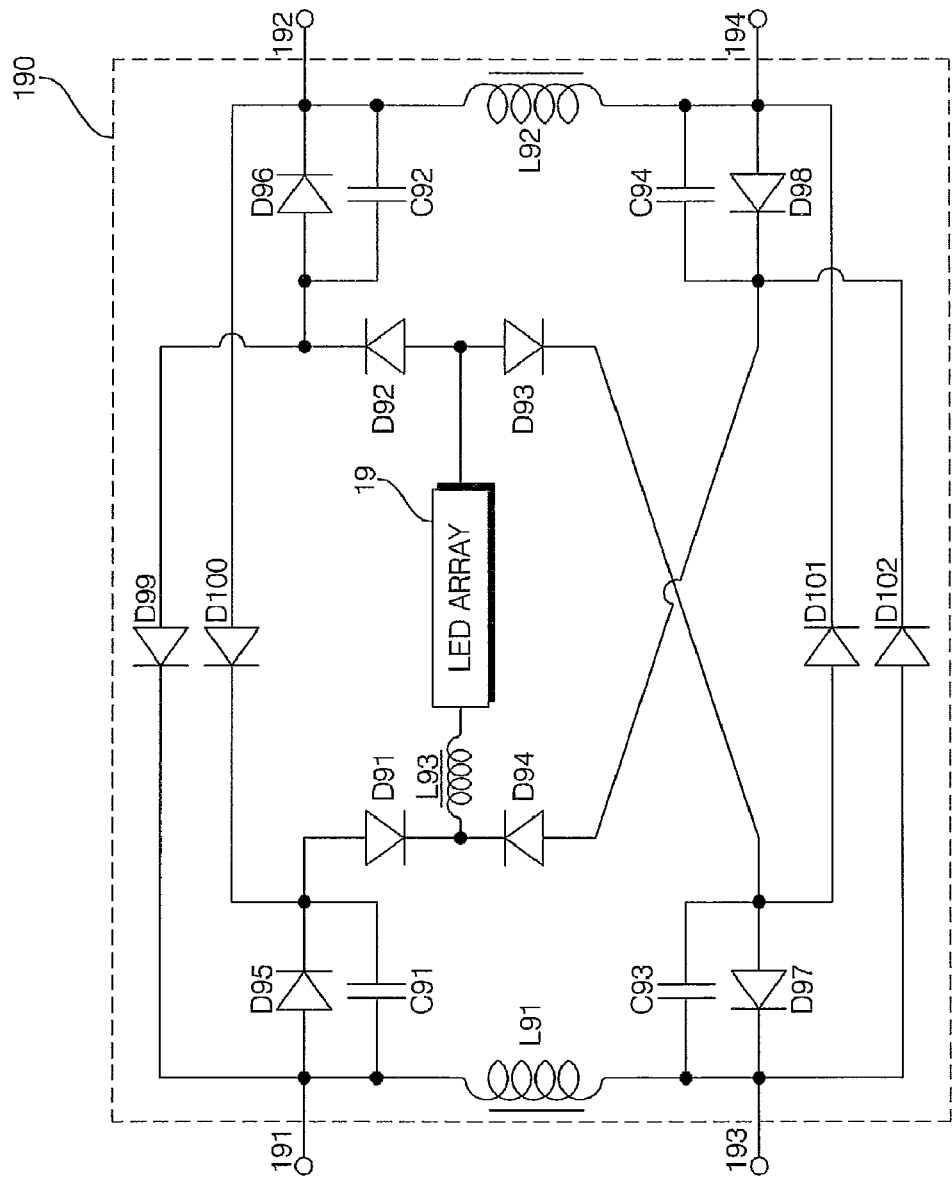
FIGS. 8A through 8J illustrate circuit diagrams of an LED fluorescent lamp according to a seventh exemplary embodiment of the present invention.

FIGS. 8A through 8I illustrate circuit diagrams of an LED fluorescent lamp 190 according to a seventh exemplary embodiment of the present invention. Referring to FIG. 8A, the LED fluorescent lamp 190 may include a plurality of diodes $D_{91}$ through $D_{94}$, an LED array 19 connected between a first node between the cathode of the diode $D_{91}$ and the cathode of the diode $D_{94}$ and a second node between the anode of the diode $D_{92}$ and the anode of the diode $D_{93}$, and a plurality of inductors $L_{91}$ through $L_{93}$.

The inductor $L_{93}$, which is connected in series to the LED array 19, may vary the impedance of the LED array 19 and may thus control the current of the LED fluorescent lamp 19 when the LED fluorescent lamp 190 is turned on. The inductor $L_{93}$ may be provided at any position between the first and second nodes.

Figure 8B:
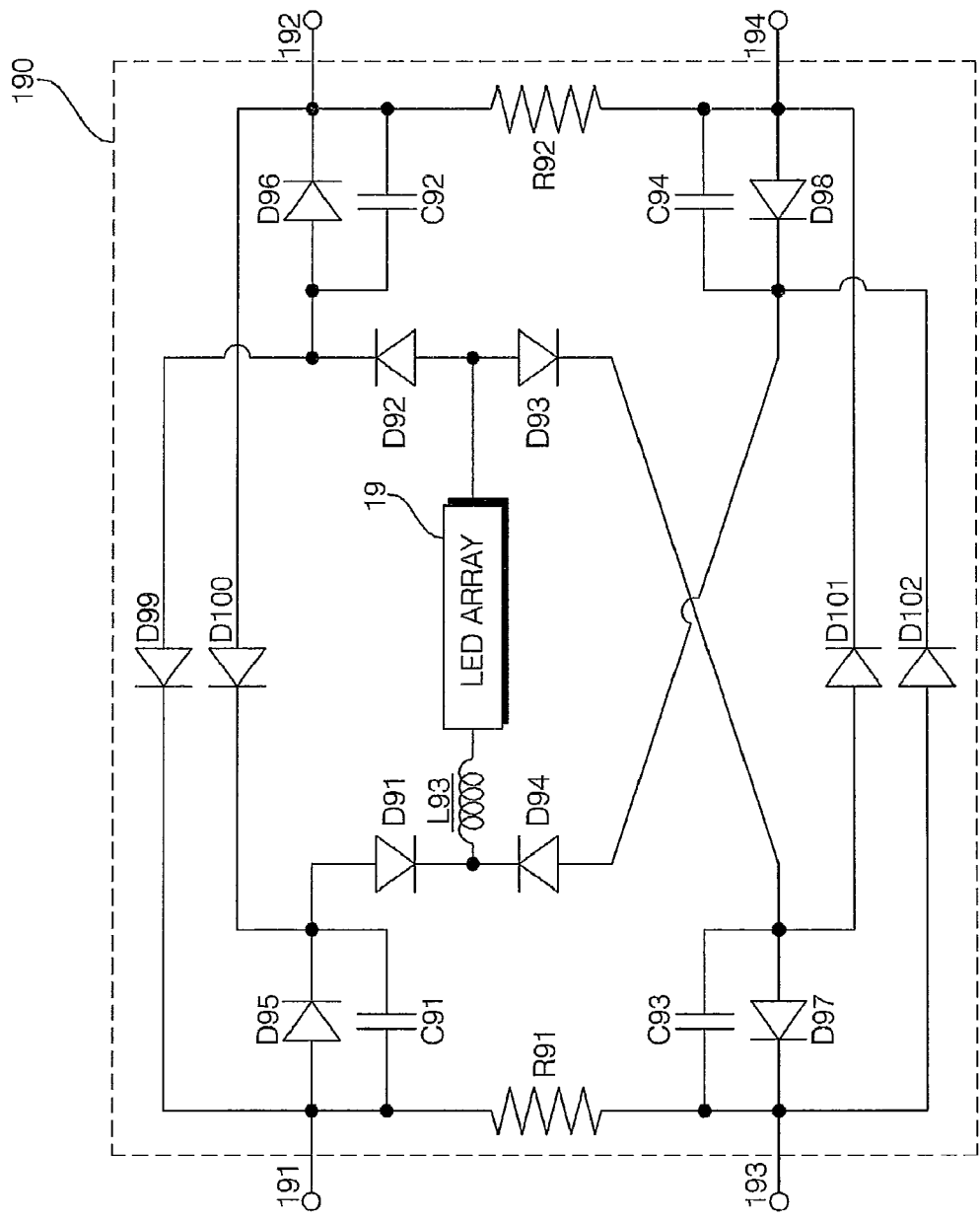

The inductors $L_{91}$ and $L_{92}$ may be replaced by resistors $R_{91}$ and $R_{92}$, respectively, as shown in FIG. 8B.

Figure 8C:
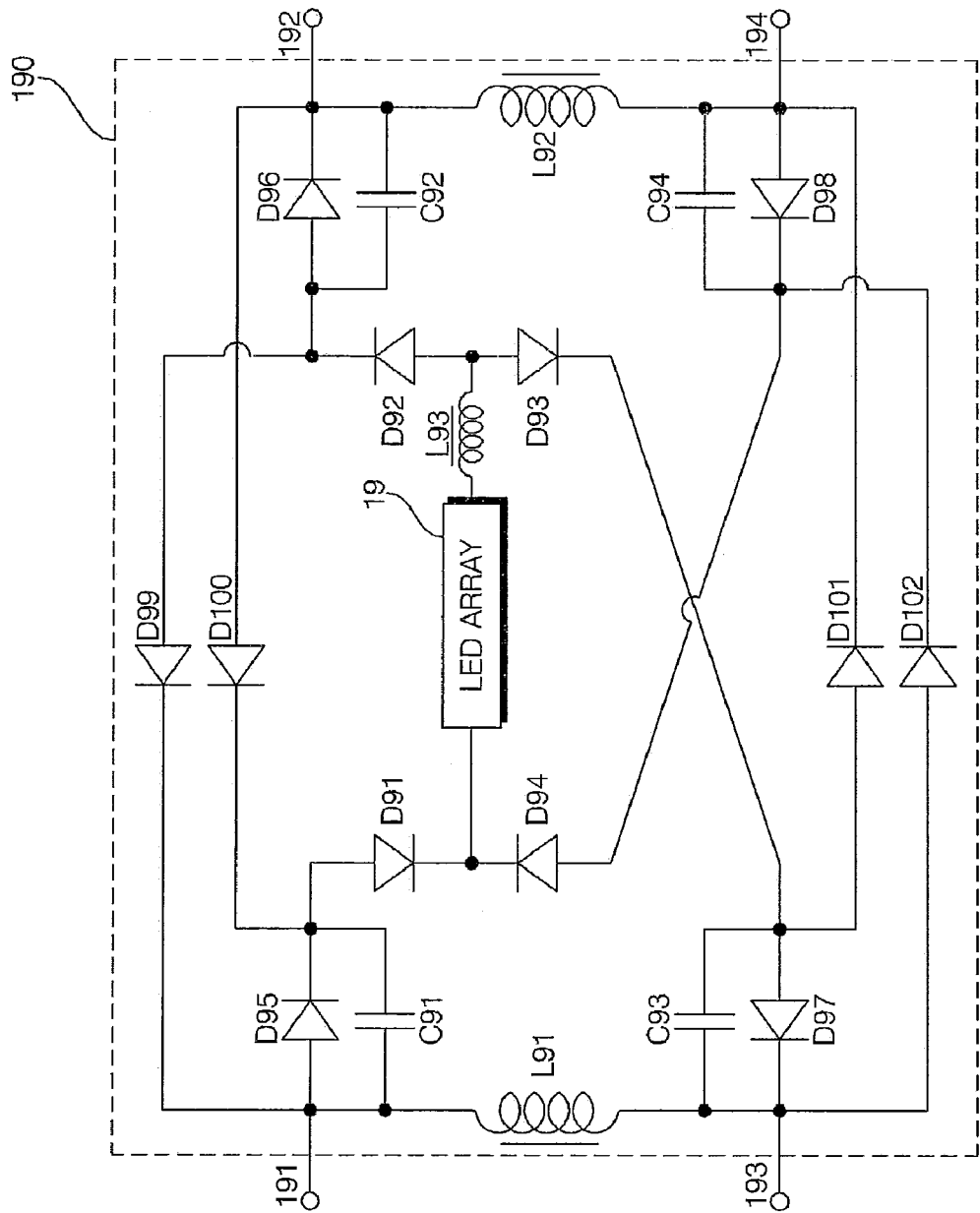

The inductor $L_{93}$ may be connected between the LED array 19 and the second node, as shown in FIG. 8C.

Figure 8D:
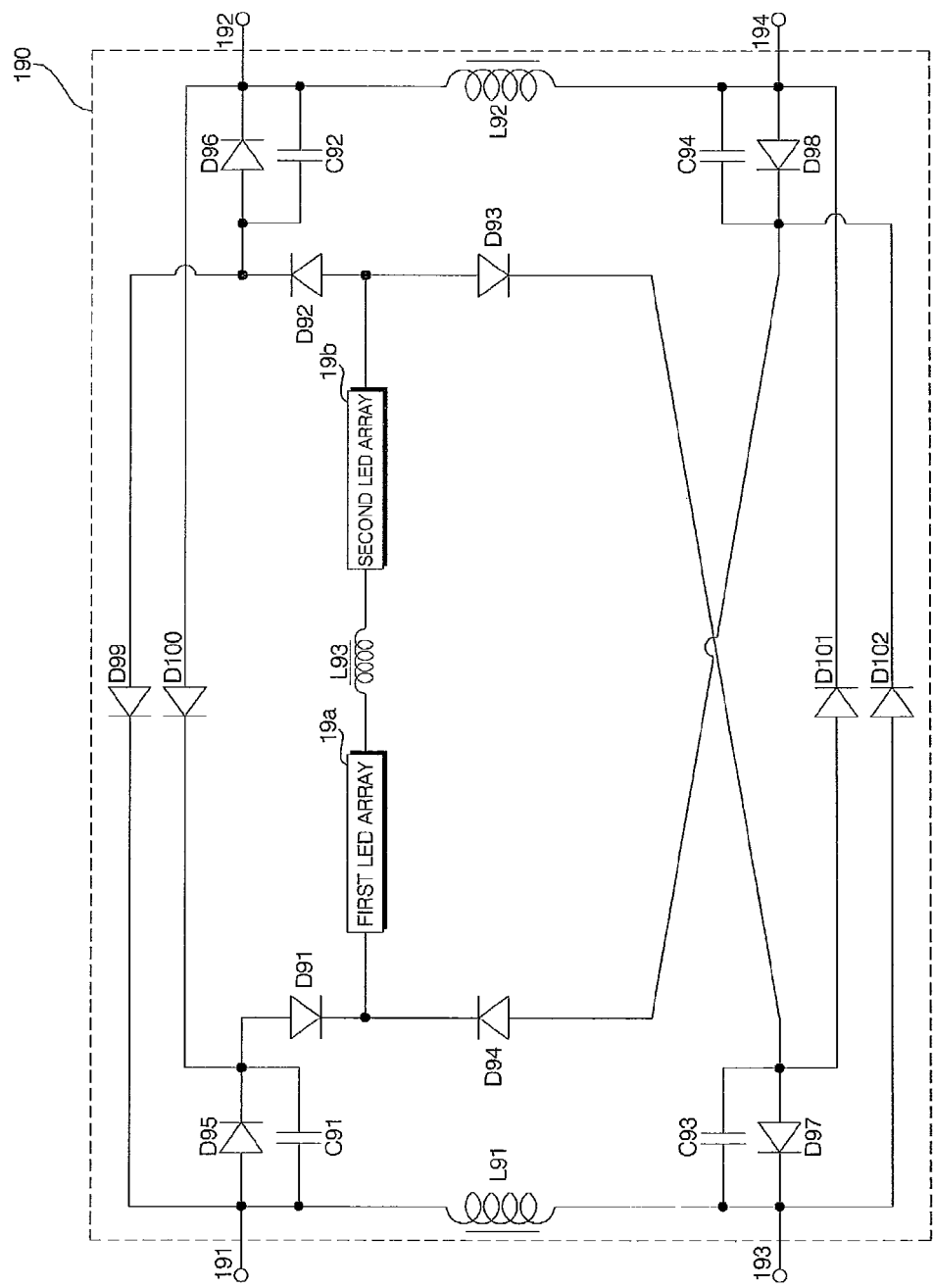

Referring to FIG. 8D, the LED fluorescent lamp 190 may include an LED array circuit unit having first and second LED arrays 19a and 19b and an inductor $L_{93}$ connected between the first and second LED arrays 19a and 19b.

More than one inductor and more than one LED array may be connected between the first and second nodes. That is, an LED array circuit unit including a number of LED arrays and a number of inductors may be connected between the first and second nodes.

Figure 8E:
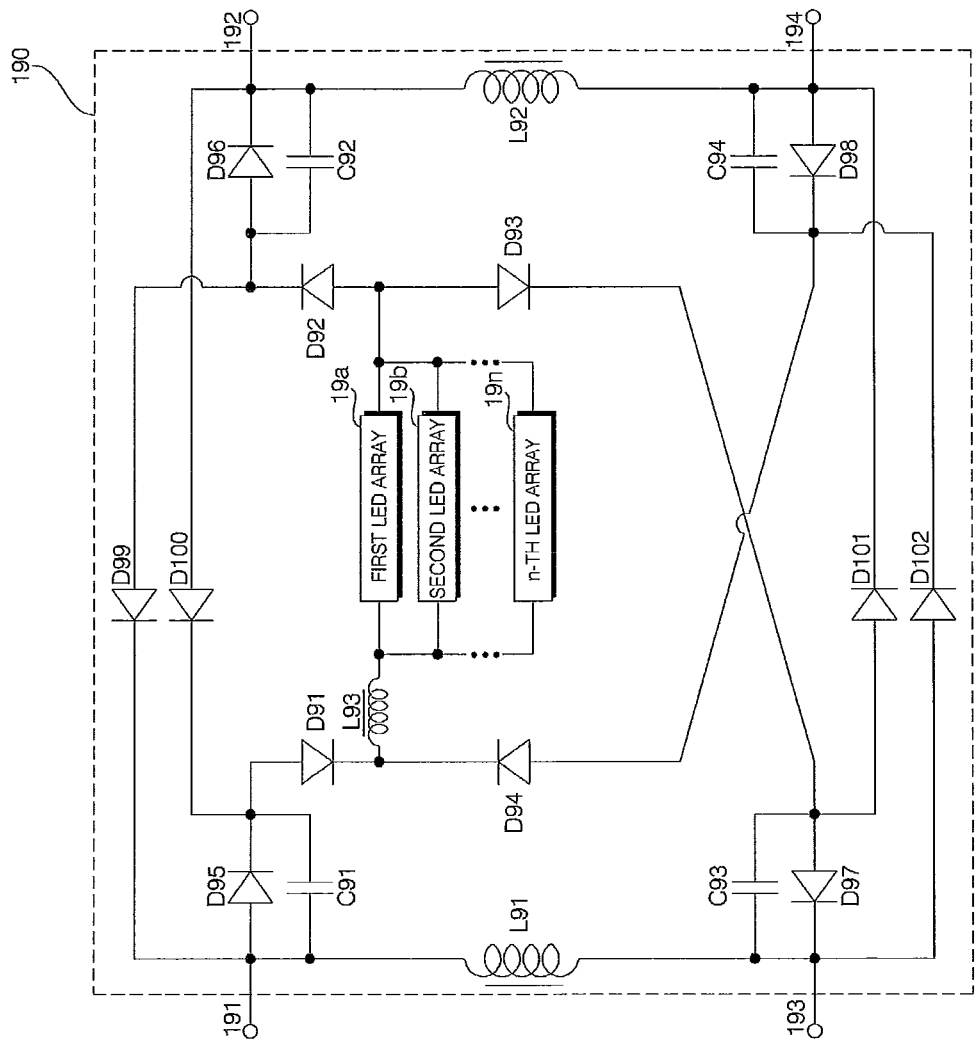
Figure 8F:
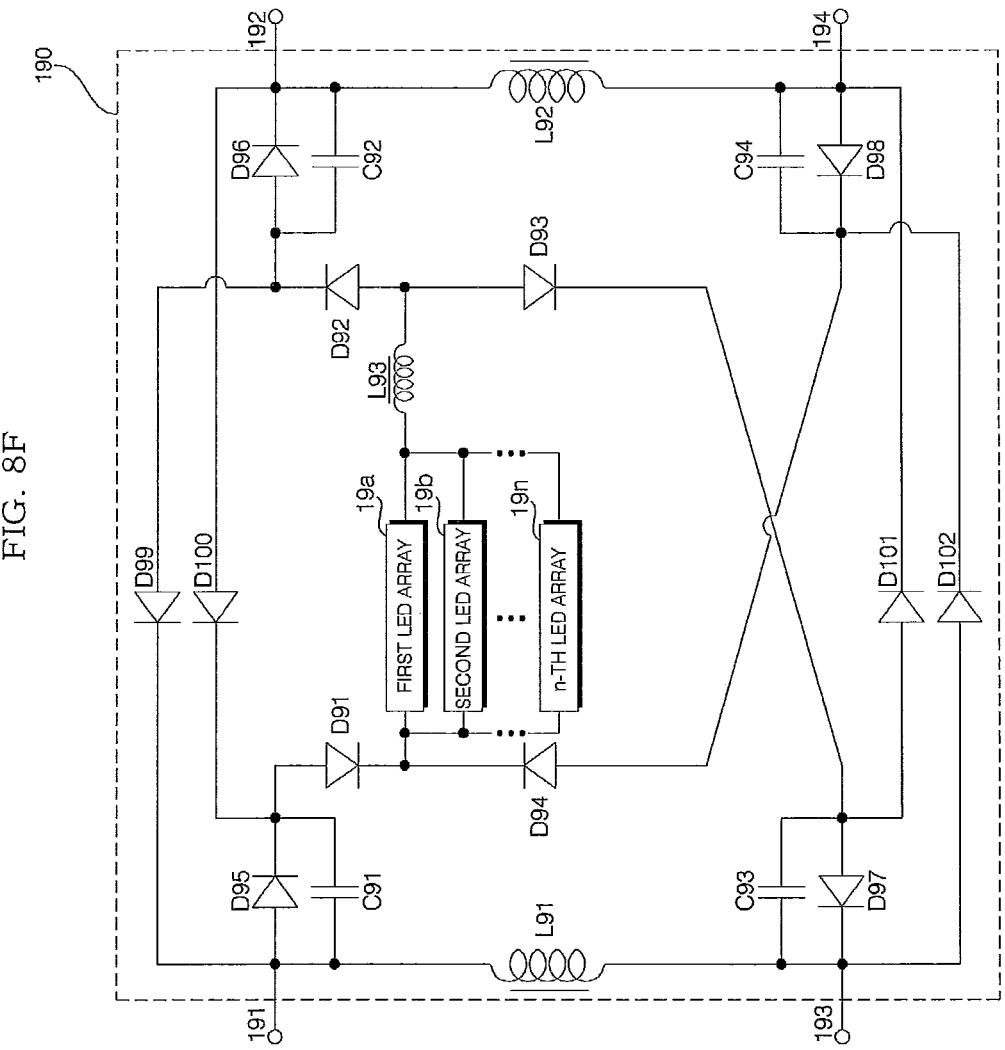

Referring to FIGS. 8E and 8F, the LED fluorescent lamp 190 may include an LED array circuit unit having an inductor $L_{93}$ and first through n-th LED arrays 19a through 19n.

Figure 8G:
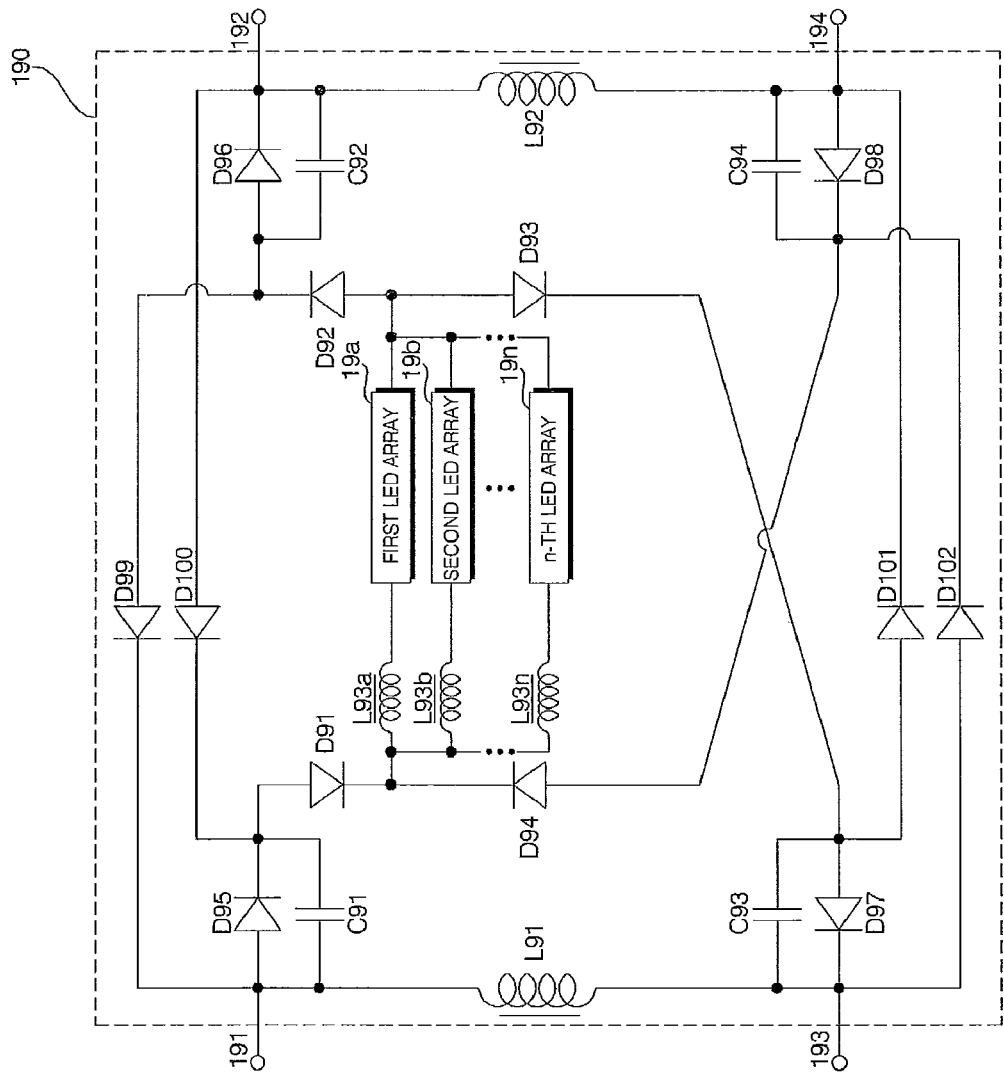
Figure 8H:
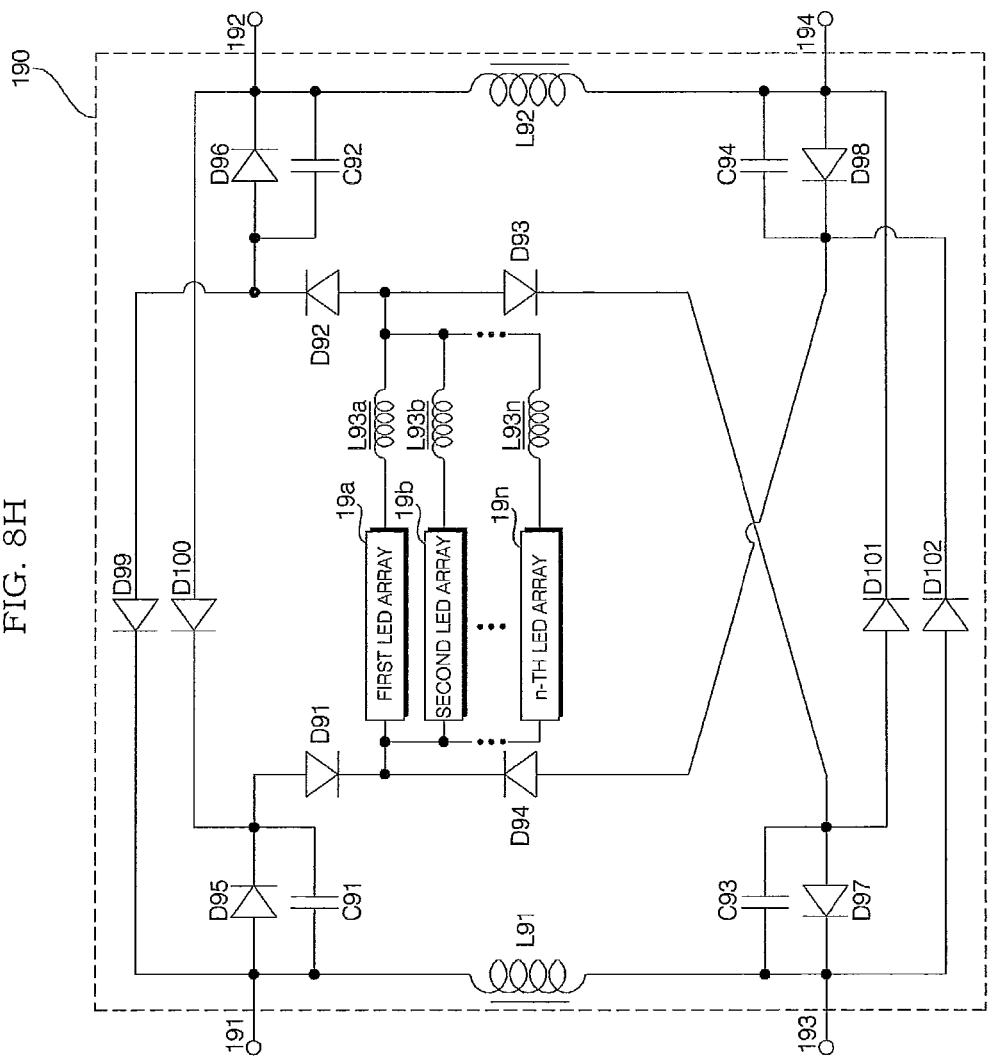

Referring to FIGS. 8G and 8H, the LED fluorescent lamp 190 may include an LED array circuit unit having first through n-th inductors $L_{39a}$ through $L_{39n}$ and first through n-th LED arrays 19a through 19n.

Figure 8I:
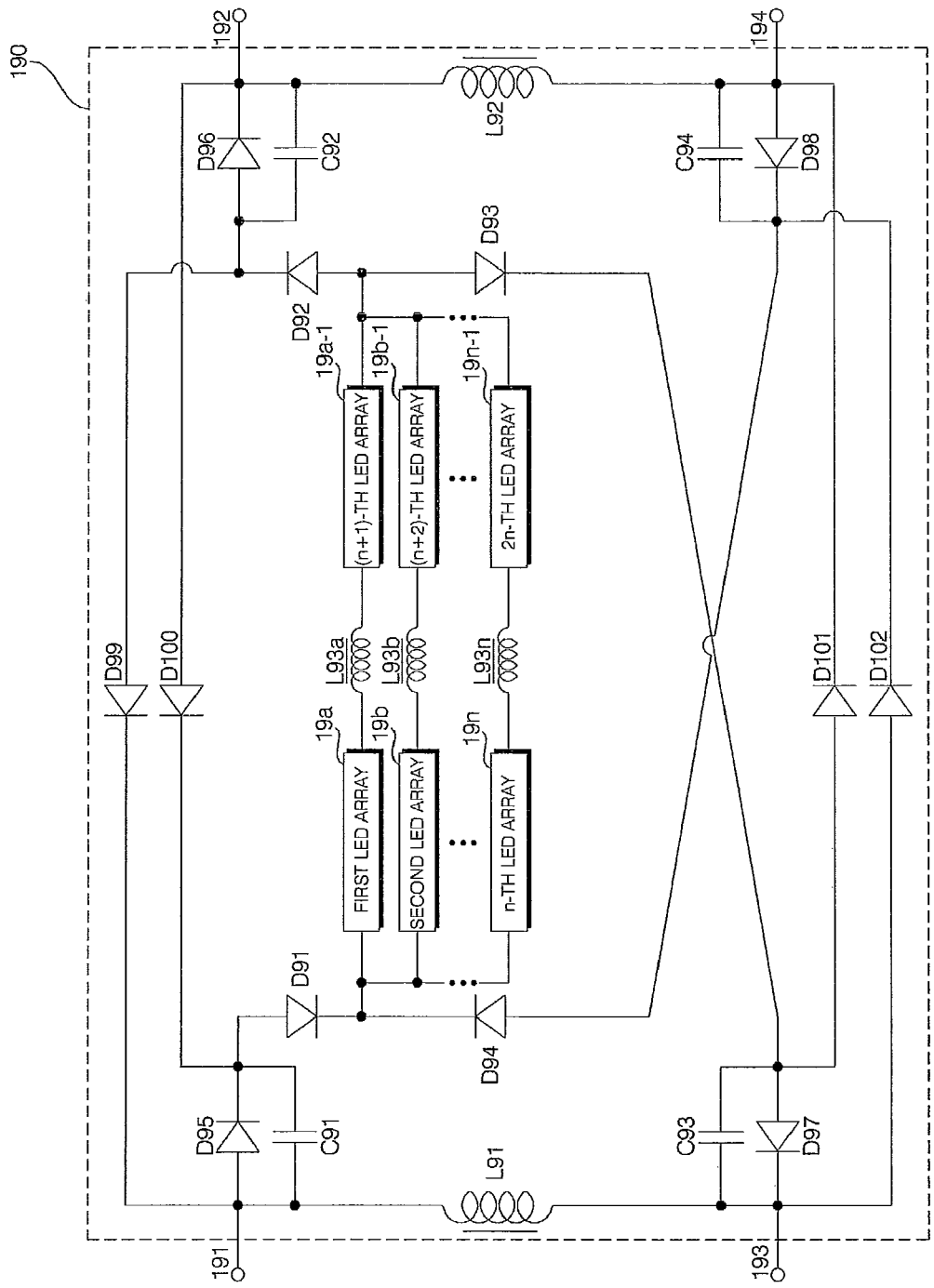

Referring to FIG. 8I, the LED fluorescent lamp 190 may include an LED array circuit unit having first through n-th LED arrays $19_a$ through $19_n$ connected in parallel to one another, (n+1)-th through 2n-th LED arrays $19_{a-1}$ through $19_{n-1}$ connected in parallel to one another, and first through n-th inductors $L_{93a}$ through $L_{93_n}$ connected between the first through n-th LED arrays $19_a$ through $19_n$, respectively, and (n+1)-th through 2n-th LED arrays $19_{a-1}$ through $19_{n-1}$, respectively.

Figure 8J:
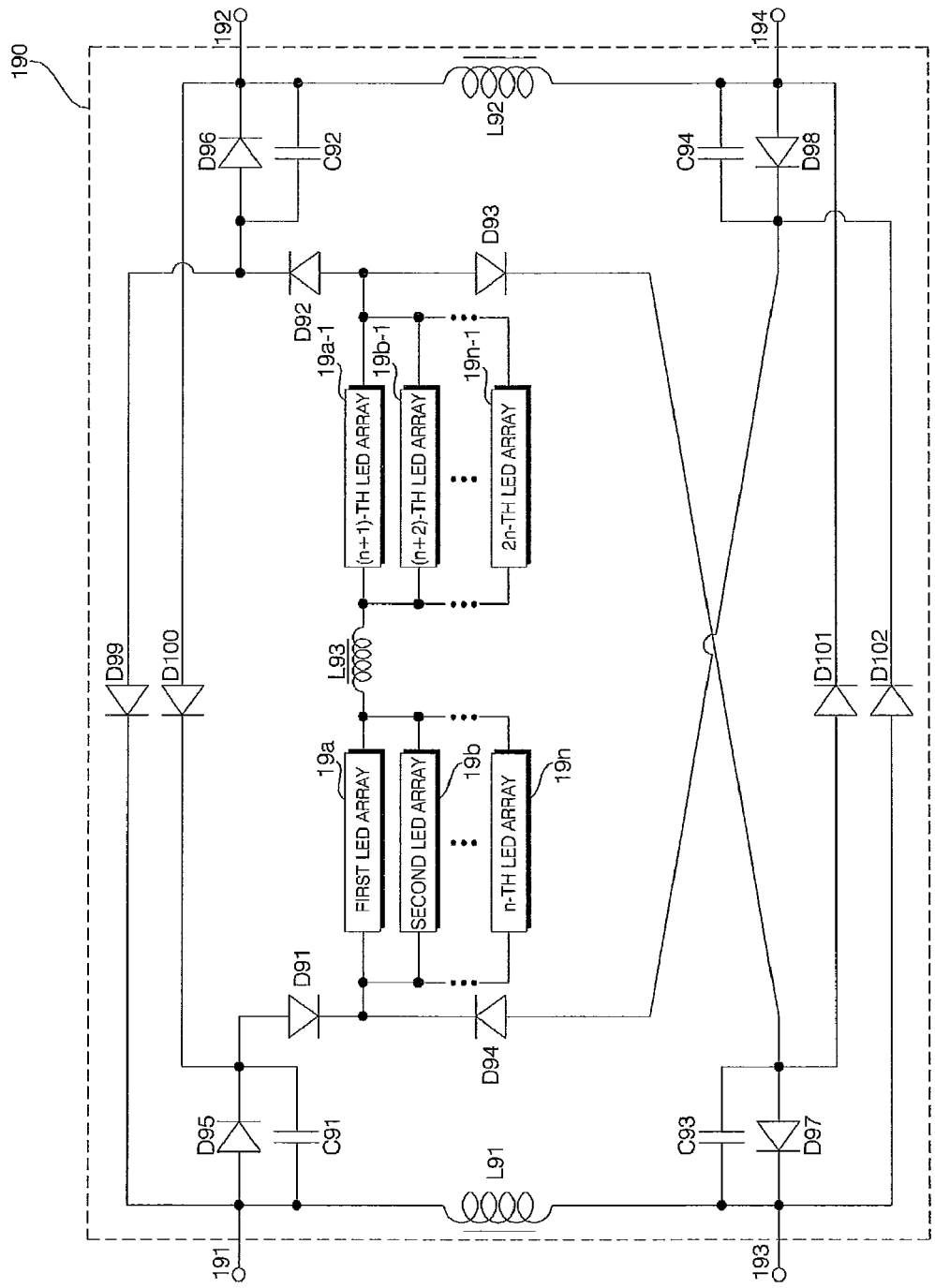

Referring to FIG. 8J, the LED fluorescent lamp 190 may include an LED array circuit unit having first through n-th LED arrays $19_a$ through $19_n$ connected in parallel to one another, (n+1)-th through 2n-th LED arrays $19_{a-1}$ through $19_{n-1}$ connected in parallel to one another, and an inductor $L_{93}$ connected between the first through n-th LED arrays $19_a$ through $19_n$ and (n+1)-th through 2n-th LED arrays $19_{a-1}$ through $19_{n-1}$.

The LED array circuit unit of the LED fluorescent lamp 190 may have various structures other than those set forth herein.

The LED fluorescent lamps 110 through 120 can be readily used in various existing fluorescent lamp ballasts without the need to change any circuitry, and this will hereinafter be described in further detail, taking the LED fluorescent lamp 150 shown in FIG. 6A, 6B or 6C.

Figure 9:
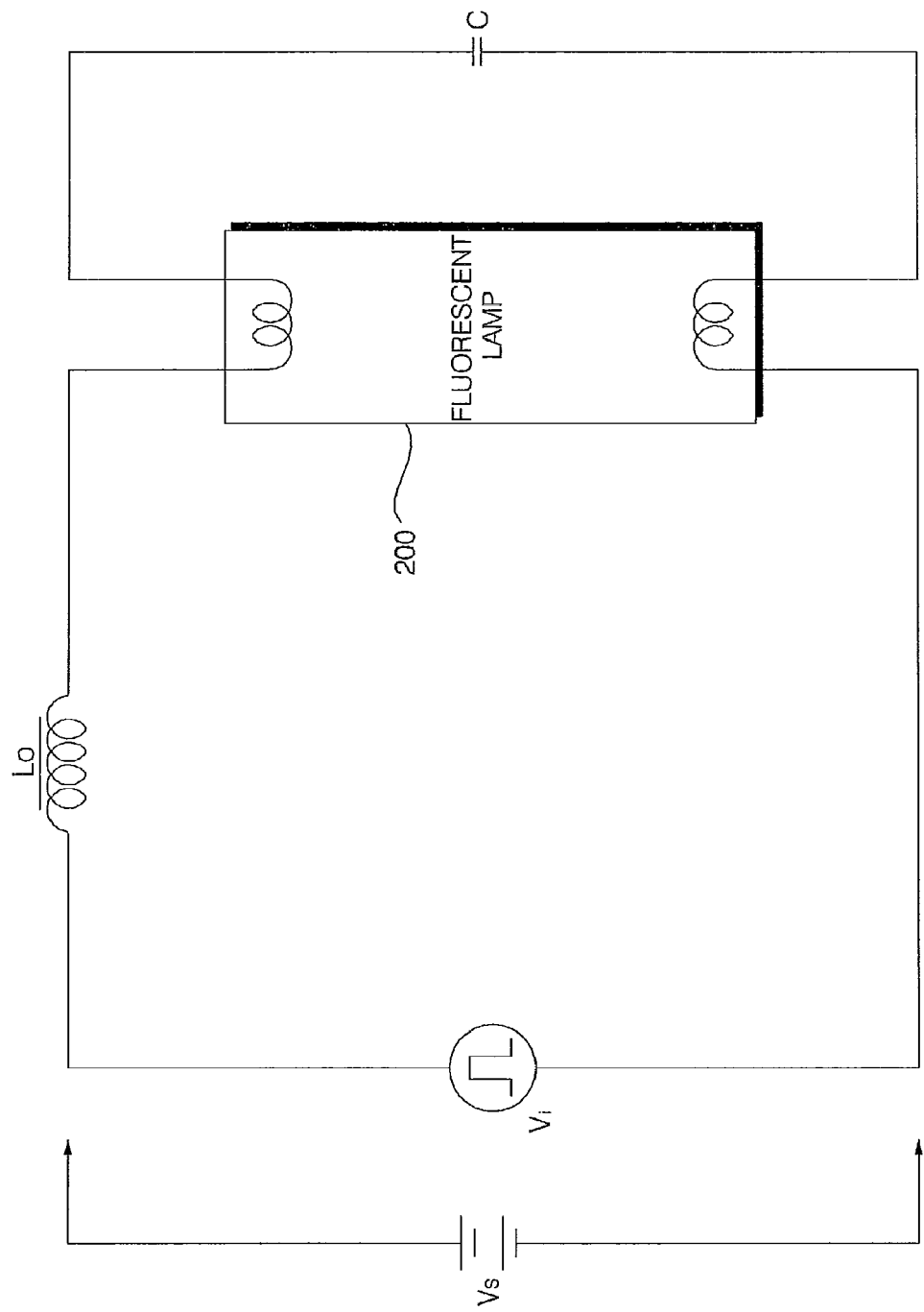
FIG. 9 illustrates a circuit diagram for explaining the operation of a series-resonant electronic fluorescent lamp ballast when using a fluorescent lamp as a load.

FIG. 9 illustrates a circuit diagram for explaining the operation of a series resonant electronic fluorescent lamp ballast when using a fluorescent lamp 200 as a load. Referring to FIG. 9, a series resonant circuit including an inductor L0 and a capacitor C may be connected to the output terminal of an inverter, which operates at a high frequency, and the fluorescent lamp 200 may be connected in parallel at either end of the capacitor C, thereby causing an initial discharge operation with a resonant voltage of the inverter $L_0$. Once the initial discharge operation is performed, the series resonant circuit may control the flow that flows in the fluorescent lamp 200 toward the inductor $L_0$.

Figure 10:
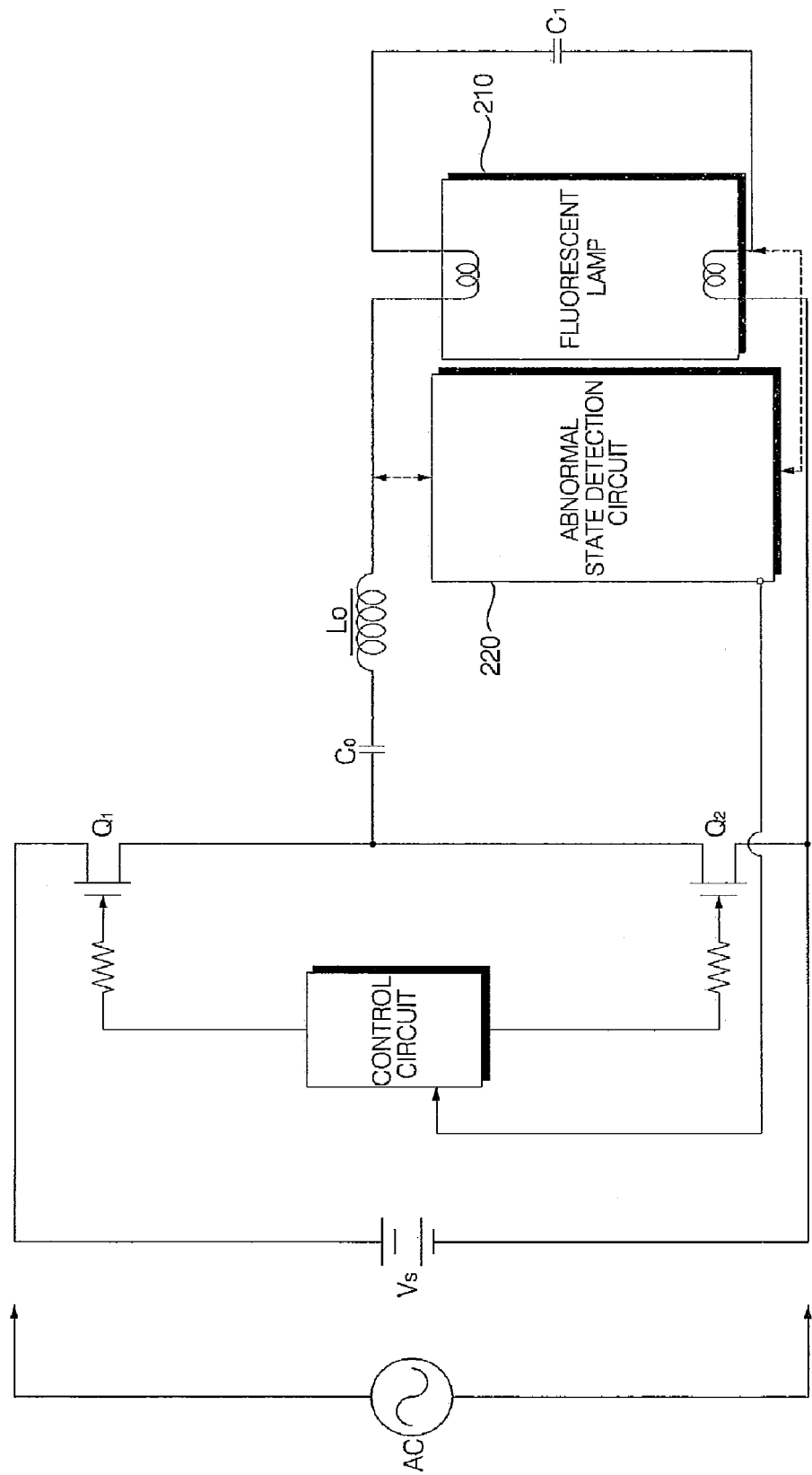
FIG. 10 illustrates a circuit diagram of the series-resonant electronic ballast shown in FIG. 9.

FIG. 10 illustrates a circuit diagram of the series resonant electronic fluorescent lamp ballast shown in FIG. 9. Referring to FIG. 10, switching circuits $Q_1$ and $Q_2$ of an inverter are driven to operate at a fixed frequency under the control of a control circuit, and thus, the series resonant electronic fluorescent lamp ballast may be classified into a forced oscillation-type fluorescent lamp ballast. A series resonant circuit including a bypass capacitor $C_0$, an inductor $L_0$ and a resonation capacitor $C_1$ may be connected to the output terminal of the inverter, thereby driving a fluorescent lamp 210. The series resonant electronic fluorescent lamp ballast may operate a fixed frequency determined in advance by the control circuit. Thus, the series resonant electronic fluorescent lamp ballast, unlike a self-oscillation-type fluorescent lamp ballast, may have various disadvantages. However, due to recent developments in semiconductor technology, switching loss can be minimized, and the operation of the series resonant electronic fluorescent lamp ballast can be stabilized by continuously monitoring the operating state of the fluorescent lamp 210. Therefore, the series resonant electronic fluorescent lamp ballast can be used for various fluorescent lamps.

However, since the series resonant electronic fluorescent lamp ballast is designed exclusively for fluorescent lamps, the series resonant electronic fluorescent lamp ballast may not be able to control the power applied to an LED fluorescent lamp, which has different properties from those of a typical fluorescent lamp. In addition, at an early stage of turning on the fluorescent lamp 210, a lamp load abnormal state detection circuit 220, which is designed based on the properties of a typical fluorescent lamp, may be driven to operate, and may thus drive a protection circuit of the inverter to operate. Thus, the fluorescent lamp 210 may not be able to be properly turned on.

Figure 11:
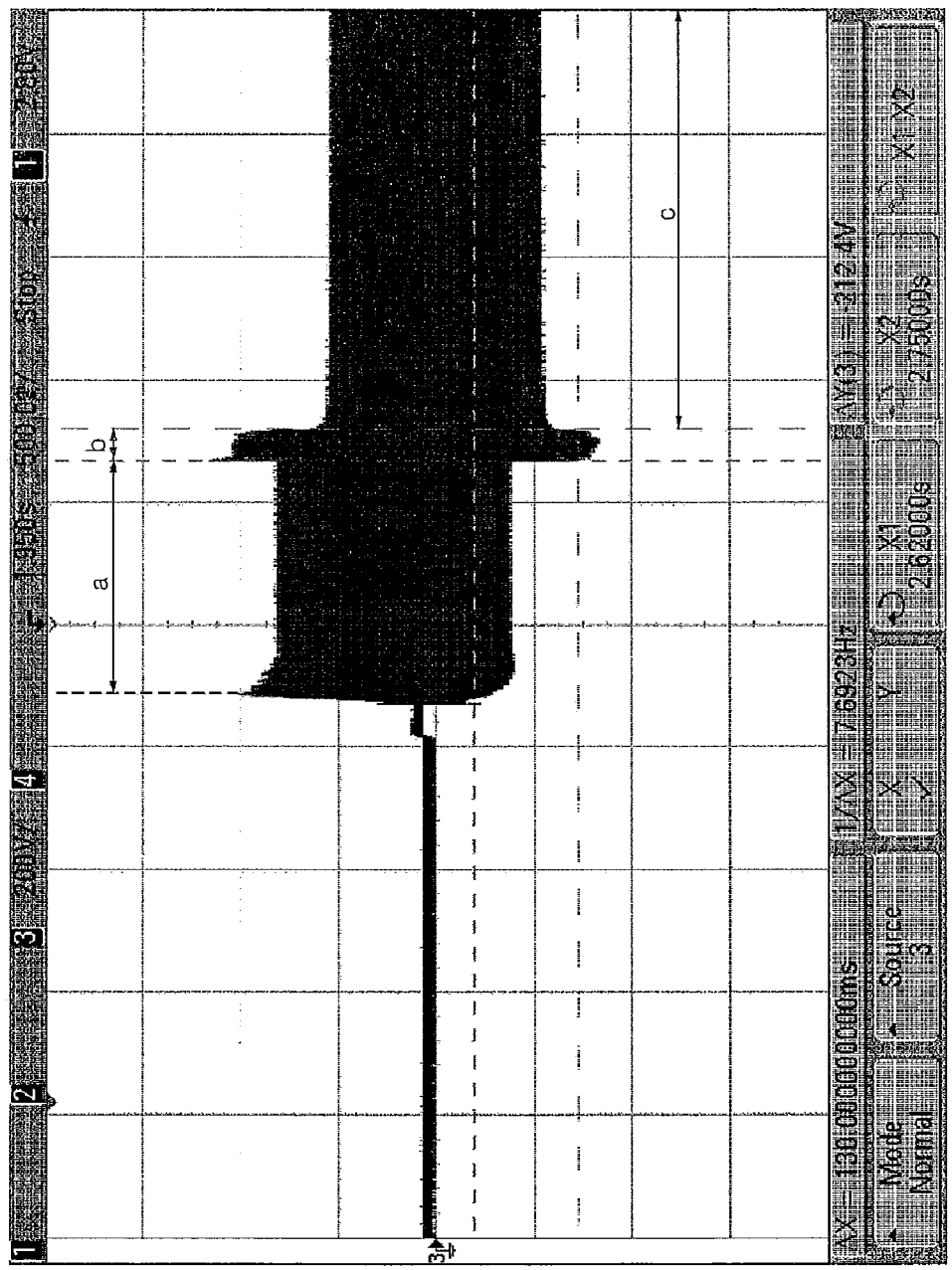
FIG. 11 illustrates a waveform diagram of a voltage applied to either end of a fluorescent lamp at an early phase of the driving of the fluorescent lamp in a normal state.

FIG. 11 illustrates a waveform diagram of a voltage applied to either end of a fluorescent lamp at an early phase of the driving of the fluorescent lamp in a normal state. Referring to FIG. 11, an early stage of driving a typical fluorescent lamp may include a preheating stage a, which is about 1 second long, a discharging stage b, which is about 0.13 seconds long and a normal turn-on stage c.

Figure 12:
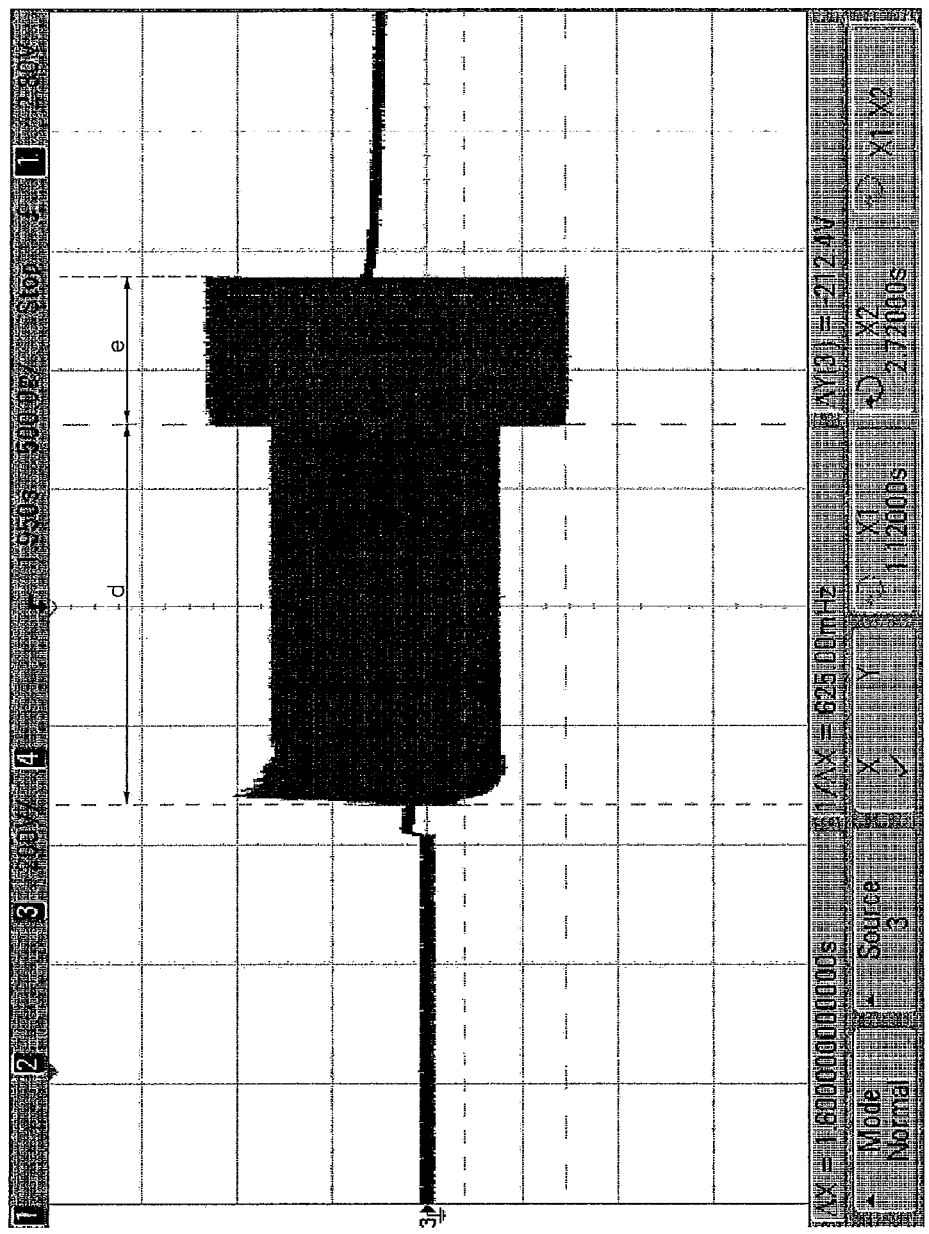
FIG. 12 illustrates a waveform diagram of a voltage applied to either end of a fluorescent lamp at an early phase of the driving of the fluorescent lamp in an abnormal state.

FIG. 12 illustrates a waveform diagram of a voltage applied to either end of a fluorescent lamp at an early phase of the driving of the fluorescent lamp in an abnormal state. Referring to FIG. 12, during a preheating period d, which is about 1.6 seconds long, and after a discharging period e, which is about 0.62 seconds long, a protection circuit may be driven to operate due to a high voltage applied to either end of a fluorescent lamp.

The load of the fluorescent lamp may be ignored until a discharging operation is initiated. The operating properties of the fluorescent lamp before the initiation of the discharging operation will hereinafter be described in detail.

A quality factor $Q_0$ of a series resonant circuit including an inductor having inductance $L_0$ and a capacitor having capacitance $C_1$ may be defined by Equation (1):

$$Q_0 = \frac{1}{\omega_0 R_0 C_1} = \frac{1}{R_0}\sqrt{\frac{L_0}{C_1}} \qquad (1)$$

where $R_0$ indicates the internal impedance of the series resonant circuit and $C_0$ indicates the capacitance of a bypass capacitor. The capacitance $C_0$ may be too high and may thus be ignored.

A voltage $V_c$ applied to the capacitor in the series resonant circuit may be defined by Equation (2):

$$V_c = \frac{1}{R_0}\sqrt{\frac{L_0}{C_1}} \cdot V_i. \qquad (2)$$

However, when using an LED fluorescent lamp, instead of a typical fluorescent lamp, as a load, a protection circuit in an inverter may be driven to operate due to a high voltage applied to the capacitor $C_1$ at an early stage of resonation.

Figure 13:
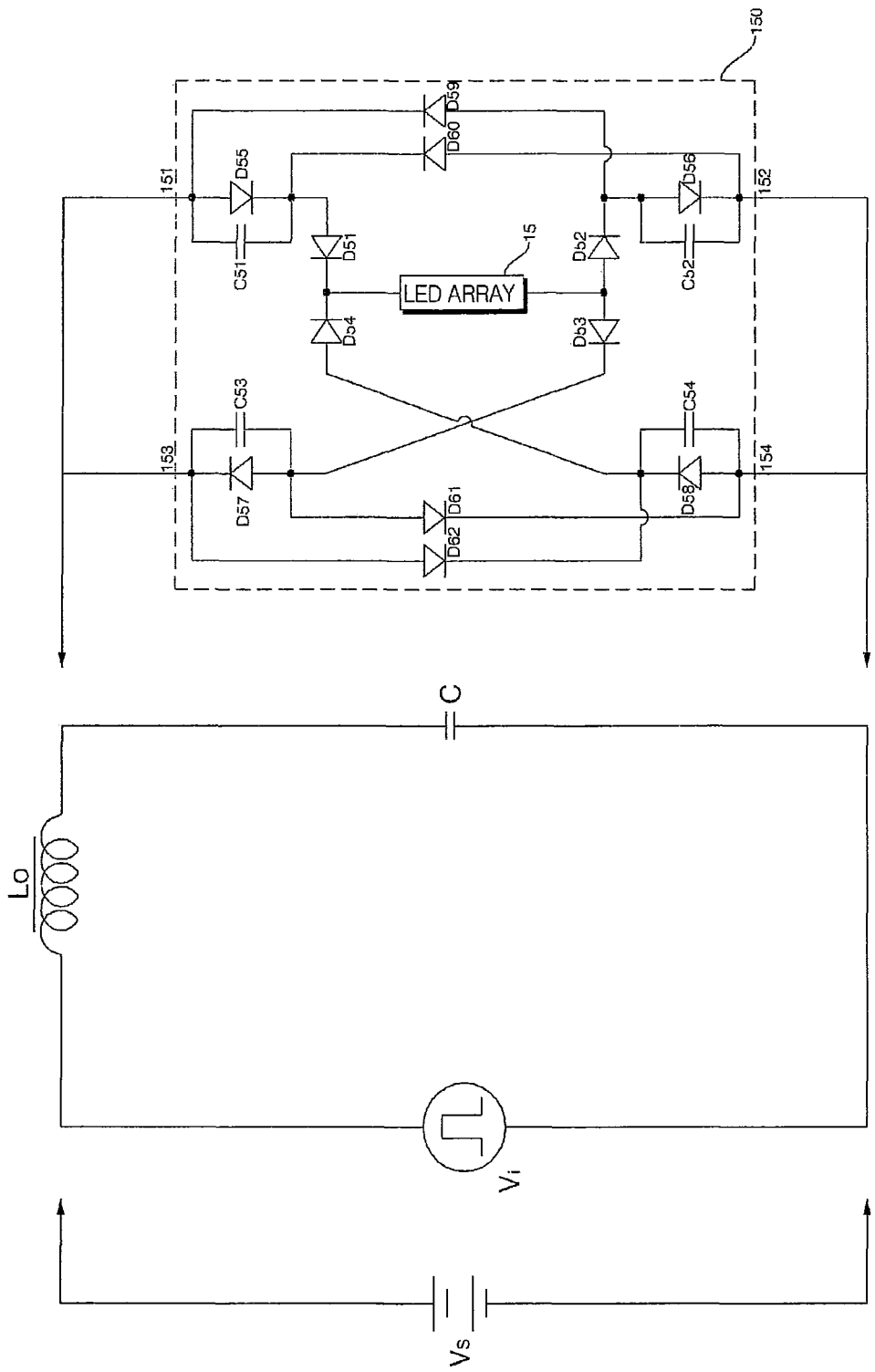
FIG. 13 illustrates a circuit diagram of a series-resonant electronic ballast including the LED fluorescent lamp of the fifth exemplary embodiment.

FIG. 13 illustrates a circuit diagram of a series resonant electronic fluorescent lamp ballast including the LED fluorescent lamp 150 of the fifth exemplary embodiment. Referring to FIG. 13, the LED fluorescent lamp 150, unlike a typical fluorescent lamp, may be recognized as a load even at an early stage of the operation of an inverter, and may thus be considered as a load resistor R. The load resistor R may be connected to a capacitor C in parallel. Complex admittance $Y_{rc}$ of the load resistor R and the capacitor C may be defined by Equation (3):

$$Y_{rc} = j\omega C + \frac{1}{R}. \qquad (3)$$

Complex impedance $Z_{rc}$ of the complex admittance $Y_{rc}$ may be defined as a factor of the resistance of the load resistor R and the capacitance of the capacitor C, as indicated by Equation (4):

$$Z_{rc} = \frac{R}{1+\omega^2 R^2 C^2} - j\frac{\omega R^2 C}{1+\omega^2 R^2 C^2}. \qquad (4)$$

Figure 14:
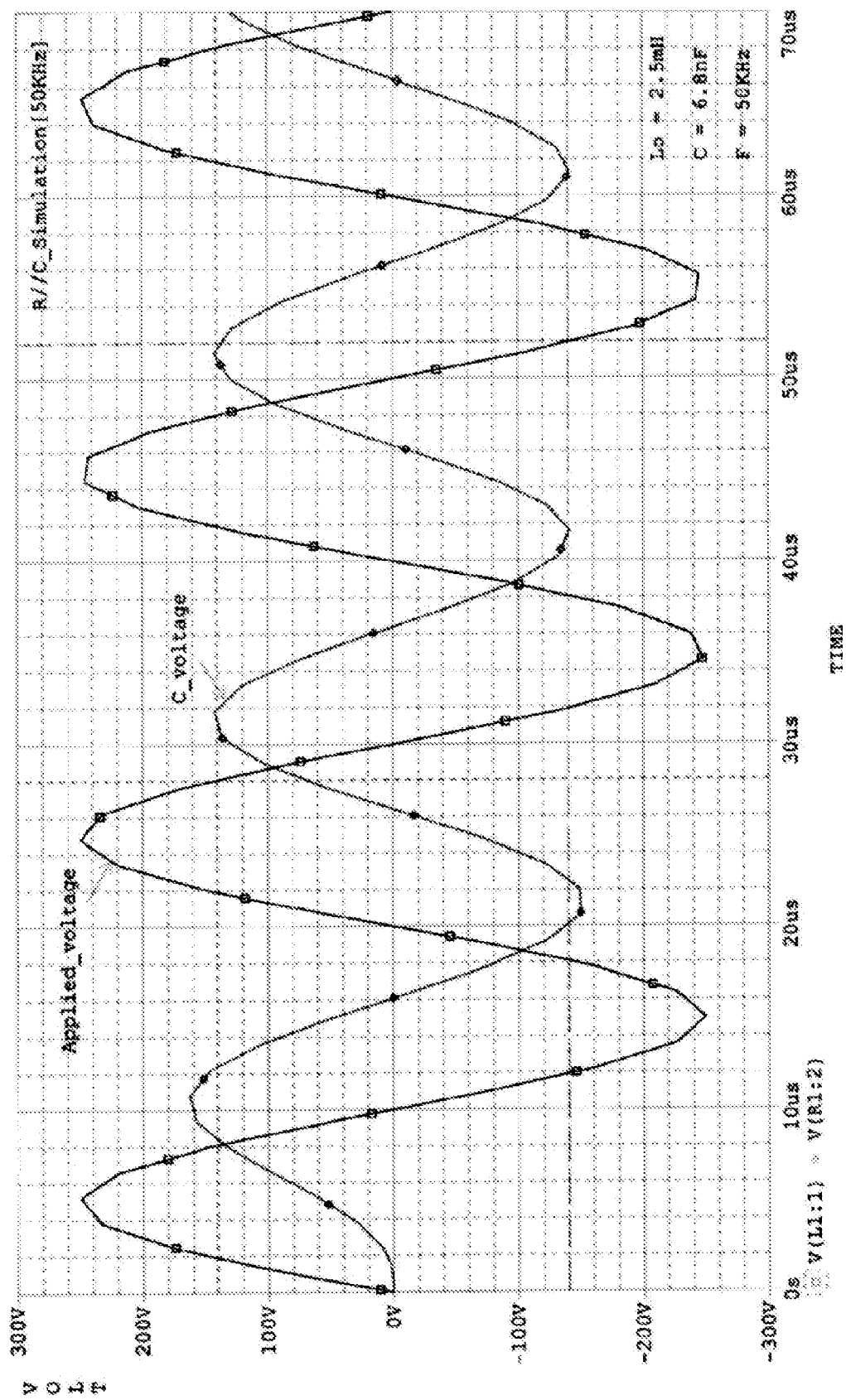
FIG. 14 shows simulation results regarding the variation of a voltage applied to an LED fluorescent lamp load.

A T8/32W fluorescent lamp has an impedance of about 500Ω. FIG. 14 illustrates simulation results obtained by applying a sinusoidal wave to a series resonant circuit and measuring a voltage applied to the LED fluorescent lamp 150 using a Professional Simulation Program with Integrated Circuit Emphasis (PSpice) when the resistance of the load resistor R was set to 500Ω and the sinusoidal wave satisfied the following equations: $L_0$=2.5 mH; C=6.8 nF; f=50 KHz; and Vm=250 V. Referring to FIG. 14, the voltage of an LED fluorescent lamp may have a peak value of 148 V, which is about a 43% decrease from a peak voltage applied to the LED fluorescent lamp 150, i.e., 250 V, and the phase of the LED fluorescent lamp may be shifted by 0.62 π. That is, it is possible to reduce the quality factor of a series resonant circuit by taking the resistance of the load resistor R into consideration even at an early stage of resonation of the series resonant circuit. Thus, it is possible to lower the peak value of a voltage applied to either end of the capacitor C and thus to prevent a protection circuit in an inverter from operating.

Referring to FIG. 13, in order to prevent a filament detection circuit in the electronic fluorescent lamp ballast, the first and third connection pins 151 and 153 may be directly short-circuited, and the second and fourth connection pins 152 and 154 may be directly short-circuited. Alternatively, the first and third connection pins 151 and 153 may be indirectly short-circuited by using a resistor or an inductor, and the second and fourth connection pins 152 and 154 may be indirectly short-circuited by using a resistor or an inductor.

The operation of the electronic fluorescent lamp ballast when the first and third connection pins 151 and 153 are short-circuited and the second and fourth connection pins 152 and 154 are short-circuited will hereinafter be described in detail. If the voltage of the sinusoidal wave increases to a threshold voltage $V_{th}$ of the LED array 15 when a voltage $V_c$, which is applied to the capacitor C is positive with respect to the second and fourth connection pins 152 and 154, i.e., when a positive voltage is applied to the first and third connection pins 151 and 153, a current may flow through the following multiple paths: [$D_{55}$-$D_{51}$-LED array 15-$D_{52}$-$D_{56}$]; [$D_{55}$-$D_{51}$-LED array 15-$D_{53}$-$D_{61}$]; [$D_{62}$-$D_{54}$-LED array 15-$D_{52}$-$D_{56}$]; and [$D_{62}$-$D_{54}$-LED array 15-$D_{53}$-$D_{61}$]. On the other hand, if the voltage $V_c$ decreases below the threshold voltage $V_{th}$ when a positive voltage is applied to the first and third connection pins 151 and 153, no current may flow in the LED array 15.

If the voltage of the sinusoidal wave decreases below the threshold voltage $V_{th}$ when a negative voltage is applied to the first and third connection pins 151 and 153, a current may flow again through the following multiple paths: [$D_{58}$-$D_{54}$-LED array 15-$D_{53}$-$D_{57}$]; [$D_{58}$-$D_{54}$-LED array 15-$D_{52}$-$D_{59}$]; [$D_{60}$-$D_{51}$-LED array 15-$D_{53}$-$D_{57}$]; and [$D_{60}$-$D_{51}$-LED array 15-$D_{52}$-$D_{59}$]. A voltage $V_m \sin(\omega t+\theta)$ applied to the LED array 15 may have its maximum $V_m$ as a peak value when not considering voltage drops that may occur in diodes.

Figure 15:
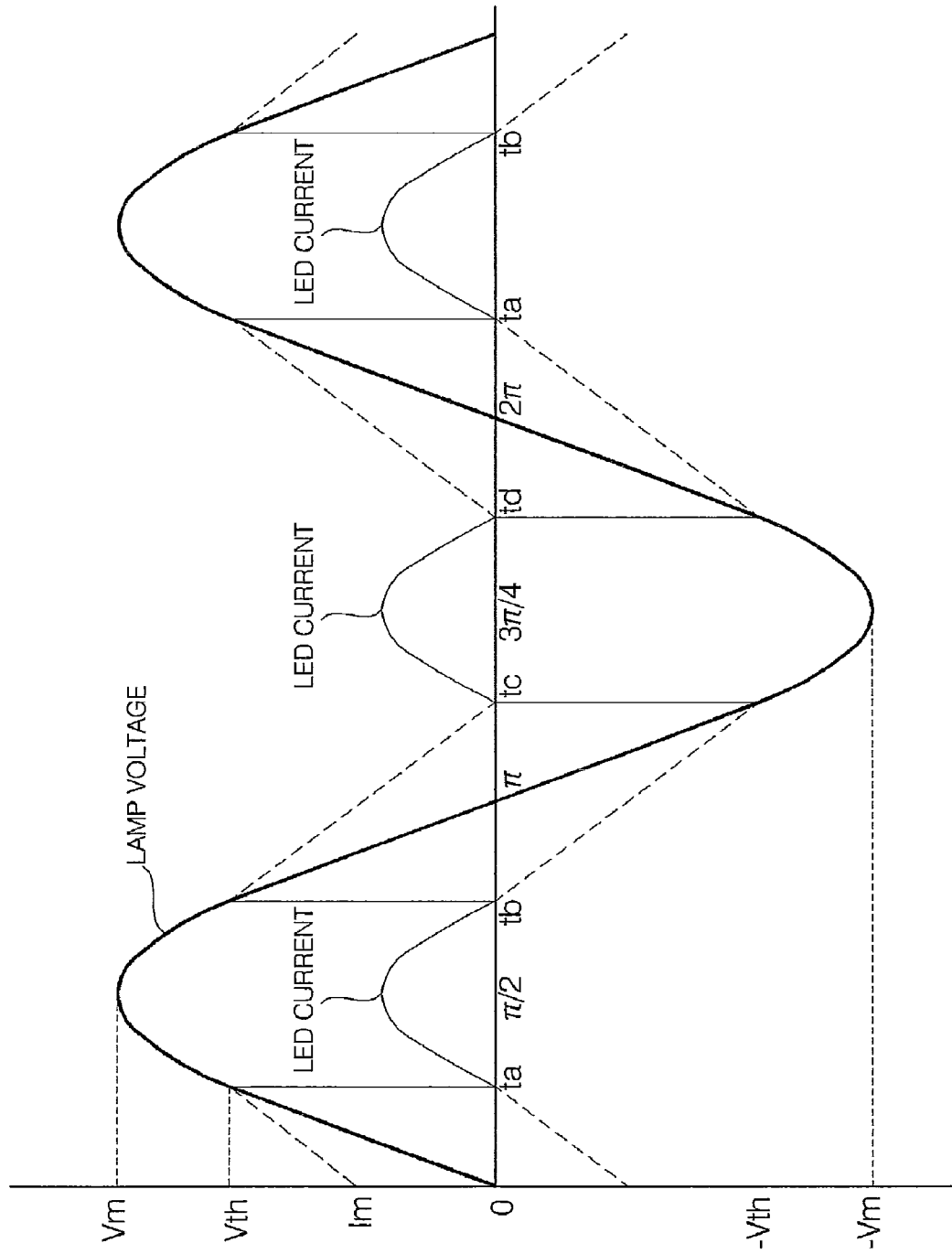
FIG. 15 illustrates a timing diagram of a current that flows in an LED array shown in FIG. 13.

FIG. 15 illustrates a timing diagram of a current that flows in the LED array 15 shown in FIG. 13. Referring to FIG. 15, during a section between 0 and ta, the capacitors $C_{53}$ and $C_{54}$ may be charged with a current through a path from the capacitor $C_{53}$ to the diode $D_{61}$ and a path from the diode $D_{62}$ to the capacitor $C_{54}$, respectively, until a current begins to flow in the LED array 15.

During a section between ta and tb, a main current may flow in the LED fluorescent lamp 150 through the following multiple paths: [$D_{55}$-$D_{51}$-LED array 15-$D_{52}$-$D_{56}$]; [$D_{55}$-$D_{51}$-LED array 15-$D_{53}$-$D_{61}$]; [$D_{62}$-$D_{54}$-LED array 15-$D_{52}$-$D_{56}$]; and [$D_{62}$-$D_{54}$-LED array 15-$D_{53}$-$D_{61}$].

During a section between tb and π, no main current may flow in the LED fluorescent lamp 150, and the capacitors $C_{53}$ and $C_{54}$ may continue to be discharged.

During a section between π and tc, the capacitors $C_{51}$ and $C_{52}$ may be charged with a current through a path from the diode $D_{59}$ to the capacitor $D_{51}$ and a path from the capacitor $C_{52}$ to the diode $D_{60}$ until a current begins to flow in the LED array 15.

During a section between tc and td, a main current may flow in the LED fluorescent lamp 150 through the following multiple paths: [$D_{60}$-$D_{51}$-LED array 15-$D_{53}$-$D_{57}$]; [$D_{58}$-$D_{54}$-LED array 15-$D_{53}$-$D_{57}$]; [$D_{60}$-$D_{51}$-LED array 15-$D_{52}$-$D_{59}$]; and [$D_{58}$-$D_{54}$-LED array 15-$D_{52}$-$D_{59}$].

During a section between td and 2π, no main current may flow in the LED fluorescent lamp 150, and the capacitors $C_{51}$ and $C_{52}$ may continue to be discharged.

During a section between td and (2π+ta), no main current may flow in the LED fluorescent lamp 150, the capacitors $C_{53}$ and $C_{54}$ may be charged to the threshold voltage $V_{th}$ until a current begins to flow in the LED array 15, and the capacitors $C_{51}$ and $C_{52}$ may be discharged.

When the capacitance of the capacitors $C_{51}$ through $C_{54}$ is $C_a$, the electronic fluorescent lamp ballast may operate as if two capacitors each having the capacitance $C_a$ are connected in parallel to the capacitor C during the section between td and to and the section between tb and tc. In this case, effective capacitance Cr of the electronic fluorescent lamp ballast may be defined by Equation (5):

$$C_r = C + 2C_a \qquad (5).$$

The quality factor $Q_0$ of the series resonant circuit of the electronic fluorescent lamp ballast may be defined by the following equation:

$$Q_0 = \frac{1}{w_0 RC}.$$

Thus, the higher the capacitance C, the lower the quality factor $Q_0$, and the lower the voltage $V_c$ applied to either end of the LED fluorescent lamp 150. It is possible to control a peak current that can flow in the LED fluorescent lamp 150 and a section during which the peak current flows in the LED fluorescent lamp 150 by varying the capacitance $C_a$. Thus, it is possible to control the power consumption of the LED fluorescent lamp 150.

The above description of the operation of the LED fluorescent lamp 150 can be directly applied to the case when the LED fluorescent lamp 150 includes more than one LED array, as shown in FIG. 6C.

Figure 16:
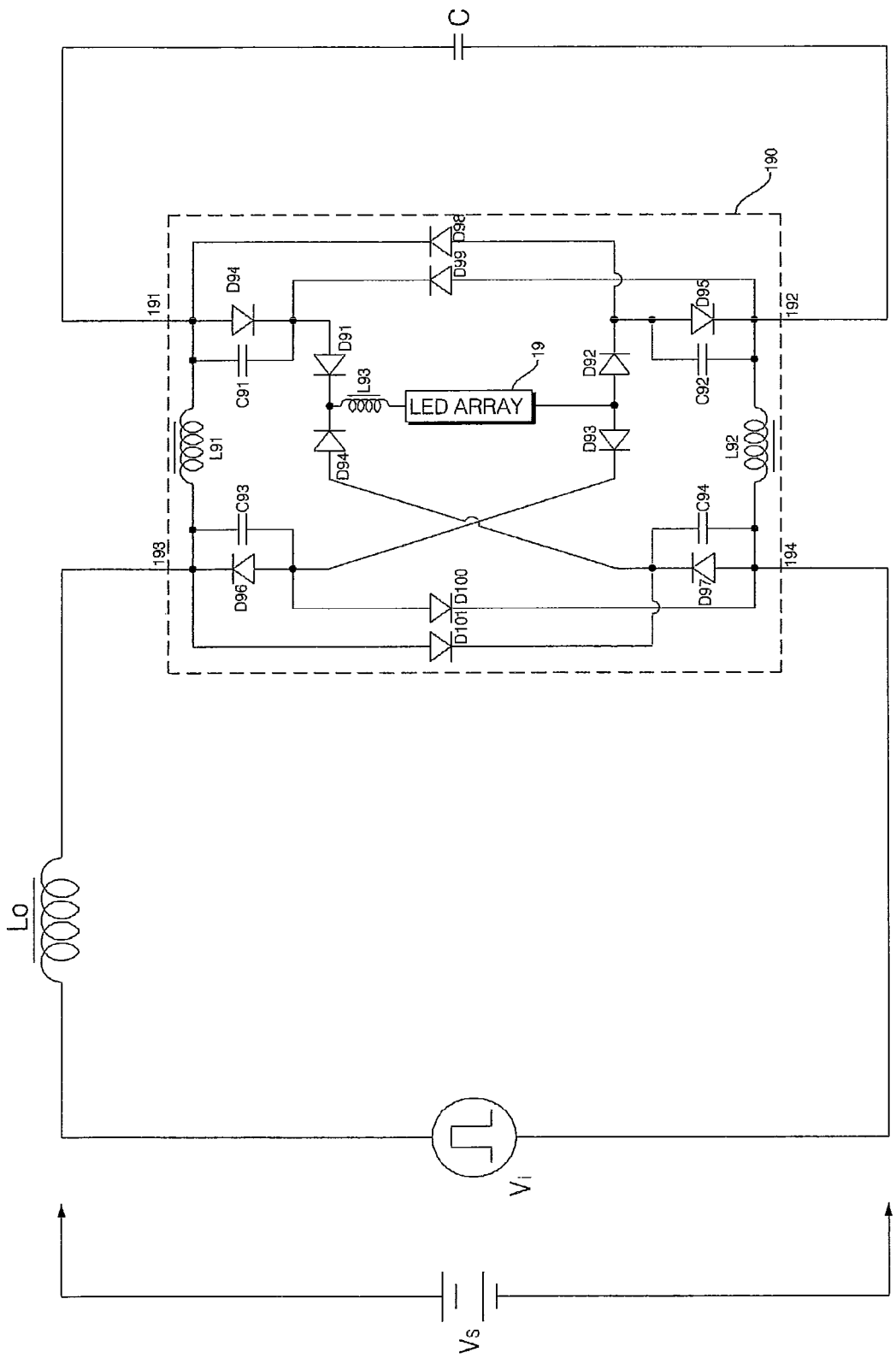
FIG. 16 illustrates a circuit diagram of a series-resonant electronic ballast including the LED fluorescent lamp of the seventh exemplary embodiment.

FIG. 16 illustrates a circuit diagram of a series resonant electronic fluorescent lamp ballast including the LED fluorescent lamp 190 of the seventh exemplary embodiment. Referring to FIG. 16, the inductors $L_{91}$ and $L_{92}$ of the LED fluorescent lamp 190 may serve as filaments, and may prevent a filament abnormal state detection circuit in an inverter from operating. The inductors $L_{91}$ and $L_{92}$ may be replaced by resistors, as shown in FIG. 8B. In this case, however, power loss may occur due to the flow of a resonant current through the resistors.

Referring to FIG. 16, a resonant capacitor C may be connected to the first and second connection pins 191 and 192, and the output terminal of an inverter including the resonant capacitor C and an inductor $L_0$ may be connected to the third and fourth connection pins 193 and 194. When the inductance of the inductors $L_{91}$ and $L_{92}$ is $L_a$, resonant inductance L of the electronic fluorescent lamp ballast may be defined by the following equation: $L = L_0 + 2L_a$. Therefore, a highest voltage may be applied to the first and second connection pins 191 and 192.

When the inductance of the inductor $L_{93}$, which is connected in series to the LED array 19, is $L_b$, an LED current with twice as high a frequency as the operating frequency of the inverter may flow in the LED array 19 during a time period when a main current is supposed to flow in the LED array 19. Thus, impedance $ZL_b$ (=$j2\omega L_b$) may be added to the impedance of the LED array 19, and thus, the quality factor $Q_0$ of the electronic fluorescent lamp ballast may vary. Therefore, it is possible to control a current that flows in the LED array 19 by control a peak voltage $V_m$ applied to the LED array 19.

The above description of the operation of the LED fluorescent lamp 190 can be directly applied to the case when the LED fluorescent lamp 190 includes more than one LED array or more than one inductor, as shown in FIGS. 8D through 8J.

Table 1 shows measurement data obtained from an LED fluorescent lamp including an LED array having 48×3 LEDs by varying the capacitance $C_a$ when the operating frequency of an inverter is 50 KHz and the capacitance C is 6800 pF.

TABLE 1

| Capacitor | 750 pF | 1000 pF | 1500 pF | 1800 pF |
|---|---|---|---|---|
| $V_i$ (V) | 134 | 130.7 | 124.7 | 121.3 |
| Power Consumption (W) | 22.0 | 20.2 | 16.8 | 14.6 |
| LED Voltage (Vdc) | 143.7 | 142.8 | 141.7 | 140.6 |
| LED Current (mAdc) | 110 | 104 | 87 | 75 |
| Lamp Input Current (mAac) | 173 | 164 | 157 | 155 |
| Resonant Current (mAac) | 298 | 289 | 278 | 266 |

The LED fluorescent lamp according to the present invention is not restricted to the exemplary embodiments set forth herein. Therefore, variations and combinations of the exemplary embodiments set forth herein may fall within the scope of the present invention.

As described above, according to the present invention, it is possible to provide an LED fluorescent lamp that can be readily used in various types of existing fluorescent lamp ballasts without a requirement of the installation of additional equipment or the change of wiring. Therefore, it is possible to easily replace an existing fluorescent lamp and thus to facilitate the use of eco-friendly, high-efficient light sources.

While the present invention has been particularly been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A light-emitting diode (LED) fluorescent lamp comprising:
an LED array including a plurality of LEDs connected in series;
first through fourth connection pins;
first through fourth capacitors connected to the first through fourth connection pins, respectively;
a first diode having an anode connected to a second end of the first capacitor and a cathode connected to a first end of the LED array;
a second diode having an anode connected to a second end of the LED array and a cathode connected to a second end of the second capacitor;
a third diode having an anode connected to the second end of the LED array and a cathode connected to a second end of the third capacitor; and
a fourth diode having an anode connected to a second end of the fourth capacitor and a cathode connected commonly to the first end of the LED array and the cathode of the first diode.

2. The LED fluorescent lamp of claim 1, further comprising:
a fifth diode having an anode connected to the first connection pin and a cathode connected to the second end of the first capacitor;
a sixth diode having an anode connected to the second end of the second capacitor and a cathode connected to the second connection pin;
a seventh diode having an anode connected to the second end of the third capacitor and a cathode connected to the third connection pin; and
an eighth diode having an anode connected to the fourth connection pin and a cathode connected to the second end of the fourth capacitor.

3. The LED fluorescent lamp of claim 2, further comprising:
a ninth diode having a cathode connected to the first connection pin and an anode connected to the second end of the second capacitor;
a tenth diode having a cathode connected to the second end of the first capacitor and an anode connected to the second connection pin;
an eleventh diode having a cathode connected to the fourth connection pin and an anode connected to the second end of the third capacitor; and
a twelfth diode having a cathode connected to the second end of the fourth capacitor and an anode connected to the third connection pin.

4. The LED fluorescent lamp of claim 3, further comprising:
a first inductor connected between the first and third connection pins; and
a second inductor connected between the second and fourth connection pins.

5. The LED fluorescent lamp of claim 4, further comprising at least one of:
a third inductor having a first end connected commonly to the cathode of the first diode and the cathode of the fourth diode and a second end connected to the first end of the LED array; and
a fourth inductor having a first end connected commonly to the anode of the second diode and the anode of the third diode and a second end connected to the second end of the LED array.

6. An LED fluorescent lamp comprising:
an LED array including a plurality of LEDs connected in series;
first through fourth connection pins;
a first diode having a cathode connected to a first end of the LED array;
a second diode having an anode connected to a second end of the LED array;
a third diode having an anode connected commonly to the second end of the LED array and the anode of the second diode;
a fourth diode having a cathode connected commonly to the first end of the LED array and the cathode of the first diode;
a fifth diode having an anode connected to the first connection pin and a cathode connected to the anode of the first diode;
a sixth diode having an anode connected to the cathode of the second diode and a cathode connected to the second connection pin;
a seventh diode having an anode connected to the cathode of the third diode and a cathode connected to the third connection pin;
an eighth diode having an anode connected to the fourth connection pin and a cathode connected to the anode of the fourth diode;
a ninth diode having a cathode connected to the first connection pin and an anode connected to the cathode of the second diode;
a tenth diode having a cathode connected to the cathode of the fifth diode and an anode connected to the second connection pin;

an eleventh diode having a cathode connected to the fourth connection pin and an anode connected to the anode of the seventh diode; and a twelfth diode having a cathode connected to the cathode of the eighth diode and an anode connected to the third connection pin.

7. An LED fluorescent lamp comprising:

first through n-th LED arrays connected in parallel to one another;

a first diode having a cathode connected to a first node to which first ends of the first through n-th LED arrays are commonly connected;

a second diode having an anode connected to a second node to which second ends of the first through n-th LED arrays are commonly connected;

a third diode having an anode connected commonly to the second node and the anode of the second diode;

a fourth diode having a cathode connected commonly to the first node and the cathode of the first diode;

a fifth diode having an anode connected to the first connection pin and a cathode connected to the anode of the first diode;

a sixth diode having an anode connected to the cathode of the second diode and a cathode connected to the second connection pin;

a seventh diode having an anode connected to the cathode of the third diode and a cathode connected to the third connection pin; and an eighth diode having an anode connected to the fourth connection pin and a cathode connected to the anode of the fourth diode.

8. The LED fluorescent lamp of claim 7, further comprising:

a ninth diode having a cathode connected to the first connection pin and an anode connected to the cathode of the second diode;

a tenth diode having a cathode connected to the anode of the first diode and an anode connected to the second connection pin;

an eleventh diode having a cathode connected to the fourth connection pin and an anode connected to the cathode of the third diode; and a twelfth diode having a cathode connected to the anode of the fourth diode and an anode connected to the third connection pin.

9. An LED fluorescent lamp comprising:

first through fourth connection pins;

first through fourth capacitors connected to the first through fourth connection pins, respectively;

a first diode having an anode connected to a second end of the first capacitor;

a second diode having a cathode connected to a second end of the second capacitor;

a third diode having an anode connected to the anode of the second diode and a cathode connected to a second end of the third capacitor;

a fourth diode having an anode connected to a second end of the fourth capacitor and a cathode connected to the cathode of the first diode;

a fifth diode having an anode connected to the first connection pin and a cathode connected to the anode of the first diode;

a sixth diode having an anode connected to the cathode of the second diode and a cathode connected to the second connection pin;

a seventh diode having an anode connected to the cathode of the third diode and a cathode connected to the third connection pin;

an eighth diode having an anode connected to the fourth connection pin and a cathode connected to the anode of the fourth diode; and an LED array circuit unit having a first end connected to a first node to which the cathode of the first diode and the cathode of the fourth diode are connected and a second end connected to a second node to which the anode of the second diode and the anode of the third diode are connected, the LED array circuit unit including at least one LED array and at least one inductor connected in series.

10. The LED fluorescent lamp of claim 9, wherein the LED array circuit unit includes a first LED array having a first end connected to the first node, a first inductor having a first end connected to a second end of the first LED array, and a second LED array having a first end connected to a second end of the first inductor and a second end connected to the second node.

11. The LED fluorescent lamp of claim 10, further comprising:

a ninth diode having a cathode connected to the first connection pin and an anode connected to the cathode of the second diode;

a tenth diode having a cathode connected to the anode of the first diode and an anode connected to the second connection pin;

an eleventh diode having a cathode connected to the fourth connection pin and an anode connected to the cathode of the third diode; and a twelfth diode having a cathode connected to the anode of the fourth diode and an anode connected to the third connection pin.

12. The LED fluorescent lamp of, claim 10, further comprising:

a first control inductor connected between the first and third connection pins; and a second control inductor connected between the second and fourth connection pins.

13. The LED fluorescent lamp of claim 9, wherein the LED array circuit unit includes a first inductor and first through n-th LED arrays, the first inductor having a first end connected to the first node, and each of the first through n-th LED arrays having a first end connected to a second end of the first inductor and a second end connected to the second node.

14. The LED fluorescent lamp of claim 13, further comprising:

a ninth diode having a cathode connected to the first connection pin and an anode connected to the cathode of the second diode;

a tenth diode having a cathode connected to the anode of the first diode and an anode connected to the second connection pin;

an eleventh diode having a cathode connected to the fourth connection pin and an anode connected to the cathode of the third diode; and a twelfth diode having a cathode connected to the anode of the fourth diode and an anode connected to the third connection pin.

15. The LED fluorescent lamp of claim 9, wherein the LED array circuit unit includes first through n-th LED arrays and a first inductor, each of the first through n-th LED arrays having a first end connected to the first node, and the first inductor having a first end connected to second ends of the first through n-th LED arrays and a second end connected to the second node.

16. The LED fluorescent lamp of claim 15, further comprising:
- a ninth diode having a cathode connected to the first connection pin and an anode connected to the cathode of the second diode;
- a tenth diode having a cathode connected to the anode of the first diode and an anode connected to the second connection pin;
- an eleventh diode having a cathode connected to the fourth connection pin and an anode connected to the cathode of the third diode; and
- a twelfth diode having a cathode connected to the anode of the fourth diode and an anode connected to the third connection pin.

17. The LED fluorescent lamp of claim 9, wherein the LED array circuit unit includes first through n-th inductors and first through n-th LED arrays, each of the first through n-th inductors having a first end connected to the first node, and the first through n-th LED arrays connected to second ends of the first through n-th LED arrays, respectively, and connected to the second node.

18. The LED fluorescent lamp of claim 9, wherein the LED array circuit unit includes first through n-th LED arrays and first through n-th inductors, each of the first through n-th LED arrays having a first end connected to the first node, and the first through n-th inductors connected to second ends of the first through n-th LED arrays, respectively, and connected to the second node.

19. The LED fluorescent lamp of claim 9, wherein the LED array circuit unit includes first through n-th LED arrays, first through n-th inductors and (n+1)-th through 2n-th LED arrays, each of the first through n-th LED arrays having a first end connected to the first node, the first through n-th inductors connected between second ends of the first through n-th LED arrays, respectively, and first ends of the (n+1)-th through 2n-th LED arrays, respectively, and each of the (n+1)-th through 2n-th LED arrays having a second end connected to the second node.

20. The LED fluorescent lamp of claim 9, wherein the LED array circuit unit includes first through n-th LED arrays, a first inductor and (n+1)-th through 2n-th LED arrays, each of the first through n-th LED arrays having a first end connected to the first node and a second end connected to a first end of the first inductor, and each of the (n+1)-th through 2n-th LED arrays having a first end connected to a second end of the first inductor and a second end connected to the second node.

* * * * *